US011909502B2

(12) United States Patent
Shrestha et al.

(10) Patent No.: US 11,909,502 B2
(45) Date of Patent: Feb. 20, 2024

(54) TIMING CONFIGURATION MANAGEMENT FOR NETWORK ENTITIES

(71) Applicant: QUALCOMM Incorporated, San Diego, CA (US)

(72) Inventors: Bharat Shrestha, San Diego, CA (US); Xiao Feng Wang, San Diego, CA (US); Liangping Ma, San Diego, CA (US); Alberto Rico Alvarino, San Diego, CA (US); Changhwan Park, San Diego, CA (US); Ayan Sengupta, San Diego, CA (US); Huilin Xu, Temecula, CA (US); Jun Ma, San Diego, CA (US); Umesh Phuyal, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 175 days.

(21) Appl. No.: 17/308,938

(22) Filed: May 5, 2021

(65) Prior Publication Data
US 2022/0360319 A1  Nov. 10, 2022

(51) Int. Cl.
*H04B 7/185* (2006.01)
*H04W 36/06* (2009.01)
*H04W 56/00* (2009.01)

(52) U.S. Cl.
CPC ........ *H04B 7/18513* (2013.01); *H04W 36/06* (2013.01); *H04W 56/0015* (2013.01)

(58) Field of Classification Search
CPC . H04B 7/18513; H04B 7/1851; H04W 36/06; H04W 56/0015; H04W 56/001
See application file for complete search history.

(56) References Cited

U.S. PATENT DOCUMENTS

2019/0342801 A1* 11/2019 Cui .................. H04W 72/23
2022/0217562 A1*  7/2022 Tang ................ H04W 24/10
(Continued)

FOREIGN PATENT DOCUMENTS

WO   WO-2021017690 A1   2/2021
WO   WO-2021037645 A1   3/2021

OTHER PUBLICATIONS

International Search Report and Written Opinion—PCT/US2022/017150—ISA/EPO—dated Jun. 3, 2022.
(Continued)

*Primary Examiner* — Harry H Kim
(74) *Attorney, Agent, or Firm* — Holland & Hart LLP

(57) ABSTRACT

Methods, systems, and devices for wireless communications are described. A serving base station or a serving satellite may transmit a timing configuration to the UE based on a reference unit, such as a location at a beam center for a respective satellite, a threshold distance relative to the beam center for the respective satellite, a reference time, or any combination thereof. In some cases, the UE may monitor for one or more SSBs from the neighboring satellites according to the timing configuration and a respective propagation delay between the UE and each of the neighboring satellites. The UE may measure the SSBs according to the measurement gap and measurement window in the timing configuration. In some examples, the UE may perform a cell handover procedure or a cell reselection procedure based on measuring the SSBs.

29 Claims, 17 Drawing Sheets

(56) References Cited

U.S. PATENT DOCUMENTS

| | | | |
|---|---|---|---|
| 2022/0232391 A1* | 7/2022 | Yang | H04W 16/04 |
| 2022/0279404 A1* | 9/2022 | Wakabayashi | H04W 36/0094 |
| 2022/0321310 A1* | 10/2022 | Jin | H04B 7/0695 |
| 2022/0353714 A1* | 11/2022 | Fu | H04W 56/0015 |
| 2022/0369249 A1* | 11/2022 | Xie | H04W 48/16 |
| 2023/0048592 A1* | 2/2023 | De Benedittis | H04W 24/10 |

OTHER PUBLICATIONS

OPPO: "Discussion on Mobility Management for Connected Mode UE in NTN", 3GPP Draft, 3GPP TSG-RAN WG2 Meeting #111-e, R2-2006784, 3rd Generation Partnership Project (3GPP), Mobile Competence Centre, 650, Route Des Lucioles, F-06921 Sophia-Antipolis Cedex, France, vol. RAN WG2, No. Electronic, Aug. 17, 2020-Aug. 28, 2020 Aug. 7, 2020 (Aug. 7, 2020), XP051911691, pp. 1-4, Retrieved from the Internet: URL: https://ftp.3gpp.org/tsg_ran/WG2_RL2/TSGR2_111-e/Docs/R2-2006784.zip R2-2006784 NTN Connected Mode Mobility.doc [retrieved on Aug. 7, 2020] p. 3, paragraph [0001] paragraph [02.4].

ZTE Corporation., et al., "Consideration on the Measurement Configuration and Reporting in NTN", 3GPP TSG-RAN WG2 Meeting#112, 3GPP Draft, R2-2009804, 3rd Generation Partnership Project (3GPP), Mobile Competence Centre, 650, Route Des Lucioles, F-06921, Sophia-Antipolis Cedex, France, vol. RAN WG2, No. Electronic, Nov. 2, 2020-Nov. 13, 2020, Oct. 23, 2020 (Oct. 23, 2020), XP051942620, 10 Pages, Retrieved from the Internet: URL: https://ftp.3gpp.org/tsg_ran/WG2_RL2/TSGR2_112-e/Docs/R2-2009804.zip R2- 2009804_Consideration on the measurement configuration and reporting in NTN.docx [retrieved on Oct. 23, 2020] paragraph [02.2].

* cited by examiner

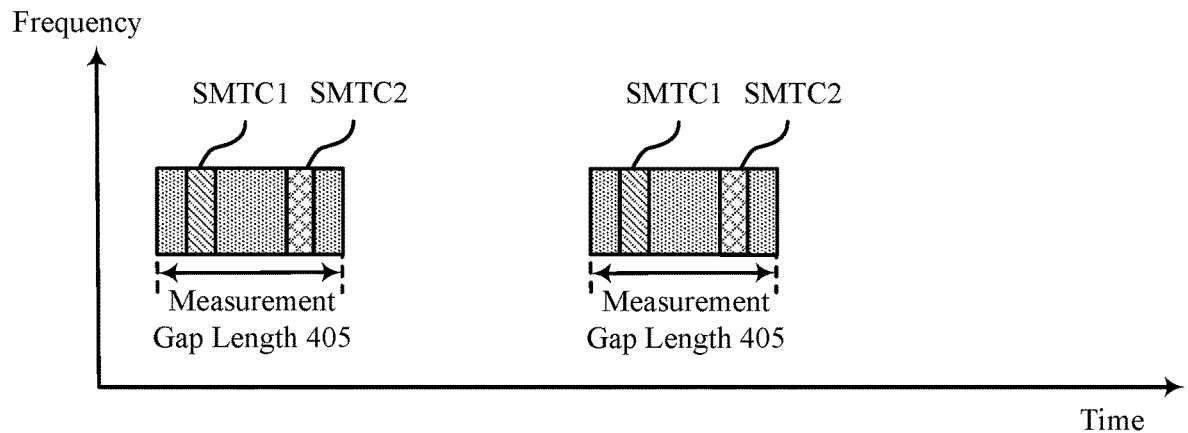
FIG. 4A
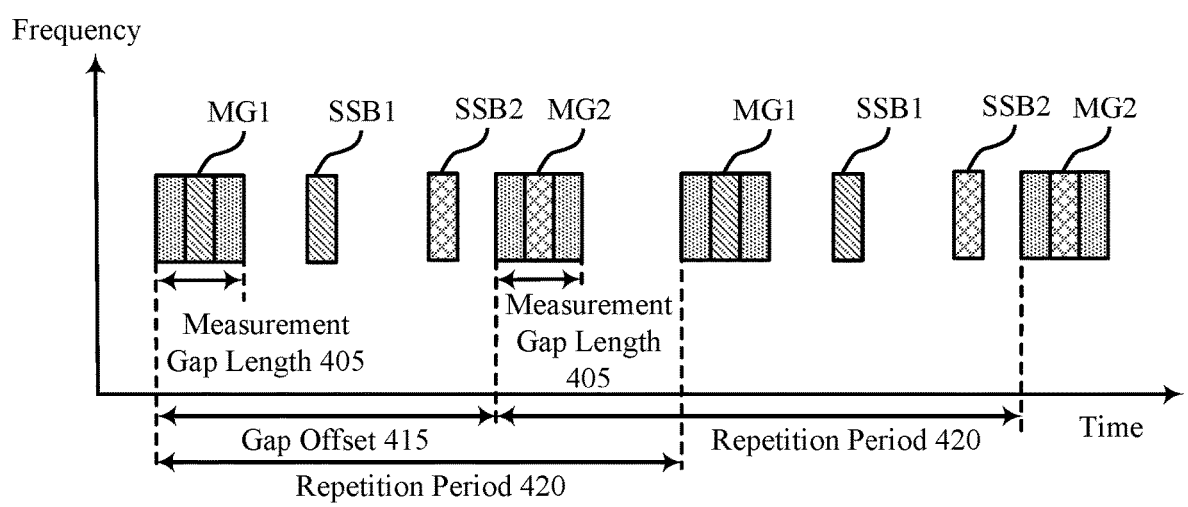
FIG. 4B
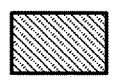 Satellite 145-b
 Satellite 145-a
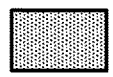 Additional Slots 410

TIMING CONFIGURATION MANAGEMENT FOR NETWORK ENTITIES

FIELD OF TECHNOLOGY

The following relates to wireless communications, including timing configuration management for network entities.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may communicate with a terrestrial base station or a satellite that supports non-terrestrial network (NTN) communications. Neighboring satellites may be located at a relatively far distance from the UE (as compared to terrestrial base stations) and may also be moving. As such, there may be a propagation delay between the UE and the neighboring satellites, which may result in the inefficiencies at a UE attempting to monitor or measure signals from the neighboring satellites.

SUMMARY

The described techniques relate to improved methods, systems, devices, and apparatuses that support timing configuration management for network entities. Generally, the described techniques provide for a serving base station or a serving satellite to adjust a timing configuration at a user equipment (UE) for measurement of one or more synchronization signal blocks (SSBs) from neighboring satellites. The base station may transmit a timing configuration to the UE based on a reference unit, such as a location at a beam center for a respective satellite, a threshold distance relative to the beam center for the respective satellite, a reference time, or any combination thereof. In some cases, the UE may monitor for one or more SSBs from the neighboring satellites according to the timing configuration and a respective propagation delay between the UE and each of the neighboring satellites. The UE may measure the SSBs according to the measurement gap and measurement window in the timing configuration. In some examples, the UE may perform a cell handover procedure or a cell reselection procedure based on measuring the SSBs.

A method for wireless communications at a UE is described. The method may include receiving, from a base station, an indication of a timing configuration for the UE based on a reference unit, the timing configuration corresponding to a measurement window and a measurement gap for measuring one or more SSBs from a set of satellites each associated with one or more satellites, monitoring for the one or more SSBs based on the timing configuration and a respective propagation delay between the UE and a respective satellite of the set of satellites associated with the one or more SSBs, and measuring at least one of the one or more SSBs in accordance with the measurement gap and the measurement window based on the monitoring and the respective propagation delay.

An apparatus for wireless communications at a UE is described. The apparatus may include a processor, memory coupled with the processor, and instructions stored in the memory. The instructions may be executable by the processor to cause the apparatus to receive, from a base station, an indication of a timing configuration for the UE based on a reference unit, the timing configuration corresponding to a measurement window and a measurement gap for measuring one or more SSBs from a set of satellites each associated with one or more satellites, monitor for the one or more SSBs based on the timing configuration and a respective propagation delay between the UE and a respective satellite of the set of satellites associated with the one or more SSBs, and measure at least one of the one or more SSBs in accordance with the measurement gap and the measurement window based on the monitoring and the respective propagation delay.

Another apparatus for wireless communications at a UE is described. The apparatus may include means for receiving, from a base station, an indication of a timing configuration for the UE based on a reference unit, the timing configuration corresponding to a measurement window and a measurement gap for measuring one or more SSBs from a set of satellites each associated with one or more satellites, means for monitoring for the one or more SSBs based on the timing configuration and a respective propagation delay between the UE and a respective satellite of the set of satellites associated with the one or more SSBs, and means for measuring at least one of the one or more SSBs in accordance with the measurement gap and the measurement window based on the monitoring and the respective propagation delay.

A non-transitory computer-readable medium storing code for wireless communications at a UE is described. The code may include instructions executable by a processor to receive, from a base station, an indication of a timing configuration for the UE based on a reference unit, the timing configuration corresponding to a measurement window and a measurement gap for measuring one or more SSBs from a set of satellites each associated with one or more satellites, monitor for the one or more SSBs based on the timing configuration and a respective propagation delay between the UE and a respective satellite of the set of satellites associated with the one or more SSBs, and measure at least one of the one or more SSBs in accordance with the measurement gap and the measurement window based on the monitoring and the respective propagation delay.

Some examples of the method, apparatuses, and non-transitory computer-readable medium described herein may further include operations, features, means, or instructions for determining the reference unit includes a reference location at a beam center associated with the respective satellite, a threshold distance relative to the beam center associated with the respective satellite, a reference time, or any combination thereof.

In some examples of the method, apparatuses, and non-transitory computer-readable medium described herein, receiving the indication of the timing configuration may include operations, features, means, or instructions for receiving, from the base station, a message including one or more parameters corresponding to the respective propagation delays from different satellites with respect to the reference unit.

In some examples of the method, apparatuses, and non-transitory computer-readable medium described herein, the one or more parameters include one or more of a periodicity, an offset, a drift rate, a measurement window adjustment rate, or a combination thereof corresponding to a drift of one or more of the set of satellites, a speed of one or more of the set of satellites, or a gateway location of the UE.

Some examples of the method, apparatuses, and non-transitory computer-readable medium described herein may further include operations, features, means, or instructions for receiving a beam switch message indicating the timing configuration and adjusting the measurement window, the measurement gap, or both based on the received indication of the timing configuration and the received beam switch message.

Some examples of the method, apparatuses, and non-transitory computer-readable medium described herein may further include operations, features, means, or instructions for receiving an indication of a timer associated with a periodicity for adjustment of the measurement window, the measurement gap, or both and adjusting the measurement window, the measurement gap, or both based on expiration of the timer, where monitoring for the one or more SSBs may be based on the adjusted measurement window, the adjusted measurement gap, or both.

Some examples of the method, apparatuses, and non-transitory computer-readable medium described herein may further include operations, features, means, or instructions for receiving an indication of a second timing configuration based on the expiration of the timer, the second timing configuration indicating the adjusted measurement window, the adjusted measurement gap, or both.

In some examples of the method, apparatuses, and non-transitory computer-readable medium described herein, monitoring for the one or more SSBs may include operations, features, means, or instructions for monitoring for the one or more SSBs in a time slot indicated by the timing configuration and at least one other time slot adjacent to the indicated time slot.

In some examples of the method, apparatuses, and non-transitory computer-readable medium described herein, receiving the indication of the timing configuration may include operations, features, means, or instructions for receiving, from the base station, a control message indicating the measurement window and the measurement gap, where the indicated measurement window, the indicated measurement gap, or both may be based on one or more defined differential propagation delays corresponding to the set of satellites, and where the one or more SSBs may be monitored during the indicated measurement window, the indicated measurement gap, or both.

In some examples of the method, apparatuses, and non-transitory computer-readable medium described herein, receiving the indication of the timing configuration may include operations, features, means, or instructions for receiving, from the base station, a set of multiple measurement window configurations corresponding to a single measurement gap, where the set of multiple measurement window configurations includes a list of measurement window configurations corresponding to a set of multiple satellites including the set of satellites.

In some examples of the method, apparatuses, and non-transitory computer-readable medium described herein, the one or more satellites of the set of satellites share an SSB frequency, a subcarrier spacing, a measurement object, or any combination thereof for communications with the UE.

In some examples of the method, apparatuses, and non-transitory computer-readable medium described herein, the list of measurement window configurations includes an SSB frequency, a subcarrier spacing, a delta signaling of a reference measurement window configuration, or a combination thereof corresponding to the set of satellites.

In some examples of the method, apparatuses, and non-transitory computer-readable medium described herein, the set of multiple measurement window configurations of the list of measurement window configurations corresponds to a single base station serving the set of satellites.

In some examples of the method, apparatuses, and non-transitory computer-readable medium described herein, receiving the indication of the timing configuration may include operations, features, means, or instructions for receiving, from the base station, an indication of a set of multiple measurement gap configurations corresponding to the one or more SSBs.

In some examples of the method, apparatuses, and non-transitory computer-readable medium described herein, the indication of the set of multiple measurement gap configurations includes a list of measurement gap configurations, each measurement gap configuration in the list of measurement gap configurations corresponding to an SSB frequency, a measurement object identifier, or both.

In some examples of the method, apparatuses, and non-transitory computer-readable medium described herein, the indication of the set of multiple measurement gap configurations includes a list of measurement gap parameters including a gap offset, a gap time advance, a gap repetition periodicity, a gap duration, or a combination thereof corresponding to an SSB frequency, a measurement object identifier, or both.

In some examples of the method, apparatuses, and non-transitory computer-readable medium described herein, the indication of the set of multiple measurement gap configurations indicates a value of a measurement gap repetition period, a measurement gap timing advance, or both.

In some examples of the method, apparatuses, and non-transitory computer-readable medium described herein, receiving the indication of the timing configuration may include operations, features, means, or instructions for receiving an indication of a rate of change of the measurement gap based on the respective propagation delay and adjusting the measurement gap according to the rate of change of the measurement gap.

Some examples of the method, apparatuses, and non-transitory computer-readable medium described herein may further include operations, features, means, or instructions for receiving a beam switch message including the indication of the rate of change of the measurement gap.

Some examples of the method, apparatuses, and non-transitory computer-readable medium described herein may further include operations, features, means, or instructions for receiving a validity flag for the measurement gap from the base station, the validity flag indicating that the measurement gap may be invalid after a validity period and receiving an indication of a second timing configuration based on the validity flag indicating that the measurement gap may be invalid.

In some examples of the method, apparatuses, and non-transitory computer-readable medium described herein, receiving the indication of the timing configuration may include operations, features, means, or instructions for receiving, from the base station, a system information block that indicates the timing configuration or one or more measurement window adjustment parameters.

In some examples of the method, apparatuses, and non-transitory computer-readable medium described herein, the UE, the satellite, the set of satellites, or a combination thereof may be nodes in a non-terrestrial network (NTN).

A method for wireless communication at a base station is described. The method may include transmitting, to a UE, an indication of a timing configuration for the UE based on a reference unit, the timing configuration corresponding to a measurement window and a measurement gap for measuring one or more SSBs from a set of satellites, each satellite of the set of satellites associated with the base station and transmitting the one or more SSBs based on the measurement gap, the measurement window, and a respective propagation delay between the UE and a satellite of the set of satellites.

An apparatus for wireless communication at a base station is described. The apparatus may include a processor, memory coupled with the processor, and instructions stored in the memory. The instructions may be executable by the processor to cause the apparatus to transmit, to a UE, an indication of a timing configuration for the UE based on a reference unit, the timing configuration corresponding to a measurement window and a measurement gap for measuring one or more SSBs from a set of satellites, each satellite of the set of satellites associated with the base station and transmit the one or more SSBs based on the measurement gap, the measurement window, and a respective propagation delay between the UE and a satellite of the set of satellites.

Another apparatus for wireless communication at a base station is described. The apparatus may include means for transmitting, to a UE, an indication of a timing configuration for the UE based on a reference unit, the timing configuration corresponding to a measurement window and a measurement gap for measuring one or more SSBs from a set of satellites, each satellite of the set of satellites associated with the base station and means for transmitting the one or more SSBs based on the measurement gap, the measurement window, and a respective propagation delay between the UE and a satellite of the set of satellites.

A non-transitory computer-readable medium storing code for wireless communication at a base station is described. The code may include instructions executable by a processor to transmit, to a UE, an indication of a timing configuration for the UE based on a reference unit, the timing configuration corresponding to a measurement window and a measurement gap for measuring one or more SSBs from a set of satellites, each satellite of the set of satellites associated with the base station and transmit the one or more SSBs based on the measurement gap, the measurement window, and a respective propagation delay between the UE and a satellite of the set of satellites.

Some examples of the method, apparatuses, and non-transitory computer-readable medium described herein may further include operations, features, means, or instructions for determining the reference unit includes a reference location at a beam center associated with the satellite, around the beam center associated with the satellite, a reference time, or any combination thereof.

In some examples of the method, apparatuses, and non-transitory computer-readable medium described herein, transmitting the indication of the timing configuration may include operations, features, means, or instructions for transmitting, to the UE, a message including one or more parameters corresponding to the respective propagation delays from different satellites with respect to the reference unit.

Some examples of the method, apparatuses, and non-transitory computer-readable medium described herein may further include operations, features, means, or instructions for transmitting a beam switch message indicating the timing configuration.

Some examples of the method, apparatuses, and non-transitory computer-readable medium described herein may further include operations, features, means, or instructions for transmitting an indication of a timer associated with a periodicity for adjustment of the measurement window, the measurement gap, or both.

In some examples of the method, apparatuses, and non-transitory computer-readable medium described herein, transmitting the indication of the timing configuration may include operations, features, means, or instructions for calculating a rate of change of the measurement gap for each of the one or more SSBs and transmitting an indication of the calculated rate of change of the measurement gap based on the respective propagation delay.

BRIEF DESCRIPTION OF THE DRAWINGS

FIGS. 3, 4A, and 4B illustrate examples of resource diagrams that support timing configuration management for network entities in accordance with aspects of the present disclosure.

DETAILED DESCRIPTION

Figure 1:
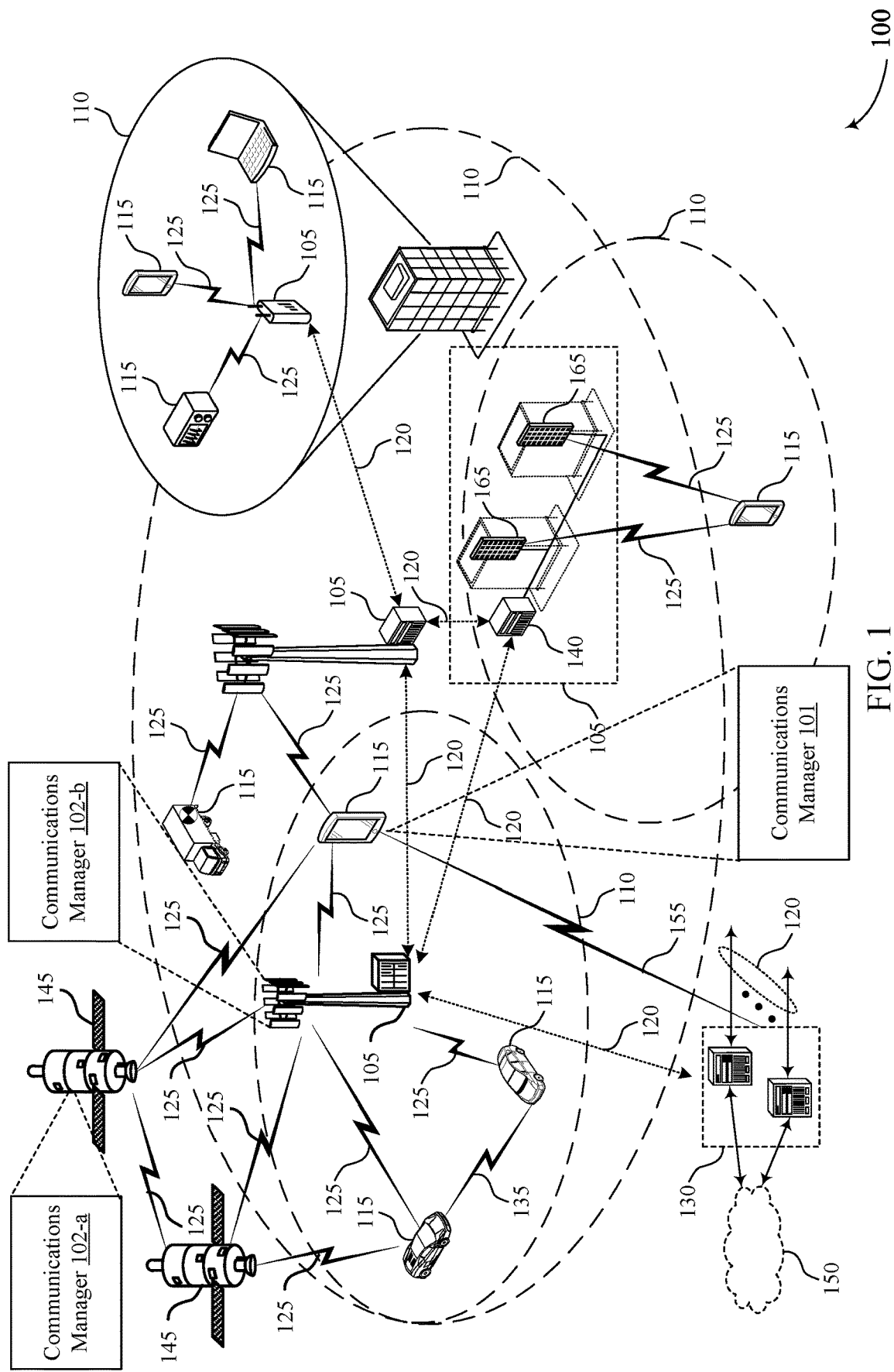
FIGS. 1 and 2 illustrate examples of wireless communications systems that support timing configuration management for network entities in accordance with aspects of the present disclosure.

In some wireless communications systems, a user equipment (UE) may communicate with a base station, which may be a terrestrial base station or a satellite that supports non-terrestrial network (NTN) communications. The base station may communicate with a serving satellite and one or more neighboring satellites that support NTN communications. Such neighboring satellites may be located at a relatively far distance from the UE (e.g., as compared to terrestrial base stations or a terrestrial network) and moving at high speed relative to typical terrestrial speeds. As such, there may be a propagation delay between the UE and the one or more satellites, which may depend on parameters that are relative to the UE, such as an elevation angle, an angular beam width, an orbital velocity or speed, or the like. The propagation delay may be different for the serving satellite and each of the neighboring satellites and therefore, when the serving satellite instructs the UE to perform measurement of the neighboring satellites (e.g., using a synchronization signal block (SSB)-based radio resource management (RRM) measurement timing configuration (SMTC) window, a measurement gap, or both), the UE may not take into consideration the various propagation delays for the different satellites, which may result in the inability for the UE to monitor for, detect, and measure signals from the neighboring satellites.

As described herein, a base station, which may be in communication with a serving satellite and a UE or may be a satellite acting as a base station, may transmit a timing configuration for a measurement window (e.g., SMTC window) and a measurement gap for measuring one or more SSBs from neighboring satellites. The timing configuration may account for a propagation delay between the neighboring satellites and the UE by including one or more parameters that the UE may use adjust the measurement window or measurement gap. The parameters may include a periodicity of the measurement window, an offset of the measurement window, a drift rate, a measurement window adjustment rate, or a combination thereof. The timing configuration may include a timer, such that after expiration of the timer, the UE may search for the SSB from a given neighboring satellite or may release the timing configuration.

In some cases, the timing configuration may not include a compensation for the propagation delay. Instead, the UE may account for the propagation delay based on a configured, or otherwise defined, duration that may extend the measurement window. The UE may monitor for the SSBs during the measurement window or extended measurement window based on receiving an indication of the measurement window, duration, or both in the timing configuration. Additionally, or alternatively, if the timing configuration does not indicate an extension for the measurement window, the UE may monitor for the SSBs during the measurement gap. In some cases, there may be multiple measurement window configurations per measurement gap. The timing configuration may include a list of measurement gap configurations for each SSB from a different network entity. In some examples, the timing configuration may include a timing advance that accounts for a rate of change of the propagation delay, which the base station or serving satellite may indicate to the UE in a beam switching command.

Aspects of the disclosure are initially described in the context of wireless communications systems. Aspects of the disclosure are further described in the context of resource diagrams and a process flow. Aspects of the disclosure are further illustrated by and described with reference to apparatus diagrams, system diagrams, and flowcharts that relate to timing configuration management for network entities.

FIG. 1 illustrates an example of a wireless communications system 100 that supports timing configuration management for network entities in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. A UE 115 may communicate with the core network 130 through a communication link 155.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 165, which may be referred to as radio heads, smart radio heads, or transmission/reception points (TRPs). Each access network transmission entity 165 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Wireless communications system 100 may also include one or more satellites 145. Satellite 145 may communicate with base stations 105 (also referred to as gateways in NTNs) and UEs 115 (or other high altitude or terrestrial communications devices). Satellite 145 may be any suitable type of communication satellite configured to relay communications between different end nodes in a wireless communication system. Satellite 145 may be an example of a space satellite, a balloon, a dirigible, an airplane, a drone, an unmanned aerial vehicle, or the like. In some examples, the satellite 145 may be in a geosynchronous or geostationary earth orbit, a low earth orbit or a medium earth orbit. A satellite 145 may be a multi-beam satellite configured to provide service for multiple service beam coverage areas in a predefined geographical service area. The satellite 145 may be any distance away from the surface of the earth.

In some cases, a cell may be provided or established by a satellite 145 as part of a NTN. A satellite 145 may, in some cases, perform the functions of a base station 105, act as a bent-pipe satellite, or may act as a regenerative satellite, or a combination thereof. In other cases, satellite 145 may be an example of a smart satellite, or a satellite with intelligence. For example, a smart satellite may be configured to perform more functions than a regenerative satellite (e.g., may be configured to perform particular algorithms beyond those used in regenerative satellites, may be configured to be reprogrammed, etc.). A bent-pipe transponder or satellite may be configured to receive signals from ground stations and transmit those signals to different ground stations. In some cases, a bent-pipe transponder or satellite may amplify signals or shift from uplink frequencies to downlink frequencies. A regenerative transponder or satellite may be configured to relay signals like the bent-pipe transponder or satellite, but may also use on-board processing to perform other functions. Examples of these other functions may include demodulating a received signal, decoding a received signal, re-encoding a signal to be transmitted, or modulating the signal to be transmitted, or a combination thereof. For example, a bent-pipe satellite (e.g., satellite 145) may receive a signal from a base station 105 and may relay the signal to a UE 115 or base station 105, or vice-versa.

UEs 115 may communicate with satellites 145, base stations 105, or both using communication links 125. In some cases, a communications manager 101 may be included in a device to support communication of satellite location information. For example, a UE 115 may include a communications manager 101 and a satellite 145 may include a communications manager 102-a or a base station 105 may include a communications manager 102-b.

In some cases, timing adjustments or frequency adjustments may account for propagation delay or Doppler shifts that may affect communications between the UE 115 and the satellite 145. For example, communication links 125 between UE 115 and satellite 145 or between UE 115 and base station 105 via a satellite 145 may include a propagation delay or Doppler shift between a UE 115 and a satellite 145, or a propagation delay or a Doppler shift between a base station 105 and a satellite 145, or both, as well as a variation in the propagation delays due to movement of the satellite.

In some examples, a serving satellite 145 may know the orbit of neighboring satellites 145. However, the serving satellite 145 may not know the location of a UE 115 other than for a connecting beam. In some examples of NTNs, a UE 115 may experience different propagation delays between the serving satellite 145 and the neighbor satellites 145. In some cases, the UE 115 may receive one or more reference signals, such as synchronization signals in an SSB, from the serving satellite 145 or neighboring satellites 145 (e.g., when performing a cell search procedure). The UE 115 may perform one or more measurements on the SSBs according to a measurement timing configuration. For example, the UE 115 may receive one or more SSBs during a measurement window (e.g., an SMTC window) and may perform one or more measurements during a measurement gap. In some examples, the timing configuration may be different for different satellites. In some cases, a UE 115 may be configured with a single measurement gap. For a moving satellite 145 with multiple beams, a timing configuration may become outdated.

In some cases, a serving base station 105 or a serving satellite 145 may adjust a timing configuration at a UE 115 over time for measurement of one or more SSBs from neighboring satellites 145. For example, the base station 105 may transmit a timing configuration to the UE 115 based on a reference unit, such as a location at a beam center for a respective satellite 145, a threshold distance relative to the beam center for the respective satellite 145, a reference time, or any combination thereof. Additionally, or alternatively, the serving satellite 145 may transmit the timing configuration to the UE 115 based on the reference unit (e.g., if the serving satellite 145 is acting as a relay for the base station 105). In some cases, the UE 115 may perform SMTC compensation when monitoring for the SSBs, which is described in further detail with respect to FIG. 3. In some other cases, the UE 115 may not perform SMTC compensation. For example, an SMTC periodicity and offset may not compensate for a differential delay. In some examples, the base station 105, the satellite 145, or both may define multiple SMTC configurations per measurement gap in the timing configuration, which is described in further detail with respect to FIG. 4A. In some other examples, the base station 105, the satellite 145, or both may define multiple measurement gaps for the UE 115 to measure the SSBs in the timing configuration, which is described in further detail with respect to FIG. 4B. In some cases, the UE 115 may adjust a measurement gap according to a rate, which is described in further detail with respect to FIG. 3.

In some cases, the UE 115 may monitor for one or more SSBs from the neighboring satellites 145 according to the timing configuration and a respective propagation delay between the UE 115 and each of the neighboring satellites 145. The UE 115 may measure the SSBs according to the measurement gap and SMTC window in the timing configuration. In some examples, the UE 115 may perform a cell handover procedure or a cell reselection procedure based on measuring the SSBs.

Figure 2:
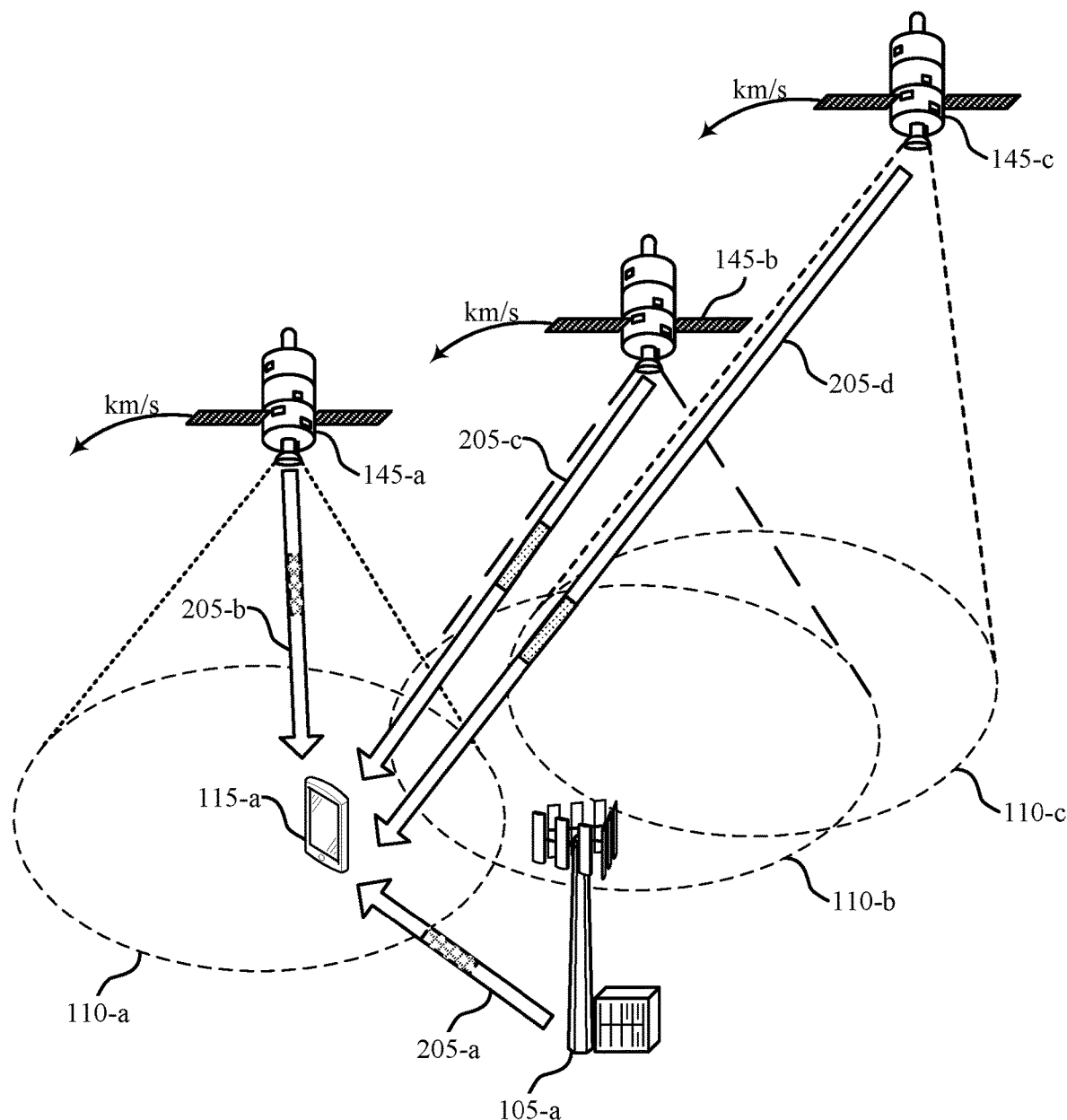

FIG. 2 illustrates an example of a wireless communications system 200 that supports timing configuration management for network entities in accordance with aspects of the present disclosure. In some examples, the wireless communications system 200 may implement aspects of wireless communications system 100. The wireless communications system 200 may include a base station 105-*a*, a UE 115-*a*, and satellite 145-*a* through satellite 145-*c*, which may be examples of a base station 105, a UE 115, and satellites 145 as described with reference to FIG. 1. Base station 105-*a* may be an example of a serving base station 105 for UE 115-*a*. Although not depicted herein, other base stations 105 may be examples of neighboring base stations 105 and may be present in the wireless communications system 200. Base station 105-*a* may serve a coverage area 110, which may include UE 115-*a* in examples of a terrestrial network. Satellite 145-*a* may serve coverage area 110-*a*, satellite 145-*b* may serve coverage area 110-*b*, and satellite 145-*c* may serve coverage area 110-*c* in examples of a NTN.

NTNs (e.g., wireless communications system 200) may provide coverage by using high-altitude vehicles between user terminals and base stations 105 (e.g., next-generation NodeBs or giga-NodeBs, which may be referred to as a gNB, and also referred to as access stations or access gateways). A base station 105 may, for example, transmit data to a satellite 145 which may then be relayed to a user terminal or vice-versa. In some examples, a satellite 145 may perform the functions of a base station 105. Additionally, or alternatively, the base station 105 may be a terrestrial-based gateway that communicates with a UE 115 via the satellite 145. For example, base station 105-*a* may serve UE 115-*a* via a downlink communication link 205, such as downlink communication link 205-*a*. Additionally, or alternatively, satellite 145-*a* may be a serving satellite 145 for UE 115-*a*, and may perform one or more of the functionalities of base station 105-*a*. For example, satellite 145-*a* may serve UE 115-*a* via downlink communication link 205-*b*. Satellite 145-*a* may have one or more neighboring satellites, such as satellite 145-*b* and satellite 145-*c*. In some cases, UE 115-*a* may monitor for one or more reference signals from satellite 145-*b* and satellite 145-*c* (e.g., neighboring satellites 145 of a serving satellite 145) prior to entering coverage area 110-*b*, coverage area 110-*c*, or both. For example, UE 115-*a* may monitor downlink communication link 205-*c* for signaling from satellite 145-*b*, downlink communication link 205-*d* for signaling from satellite 145-*c*, or both.

A user terminal may be any device capable of transmitting signals to a satellite 145. Examples of a user terminal may include a UE 115, a relay equipment configured to relay a signal between a satellite and a user terminal, or a combination thereof. NTNs may involve the use of high altitude platform stations (HAPSs) or satellites to provide coverage for terrestrial base stations 105 and UEs 115. The terms HAPS and satellite are used interchangeably herein to refer to a remote NTN device that may provide coverage to one or more other high altitude or terrestrial devices. Likewise, the terms gateway and base station 105 are used interchangeably herein to refer to a network node that serves a UE 115 and provides network access to the UE 115.

In the example of FIG. 2, satellite 145-*a* may relay communications between base station 105-*a* and UE 115-*a*. For example, base station 105-*a* may communicate with UE 115-*a* via satellite 145-*a* or vice-versa. In some examples, for communications originating at base station 105-*a* and going to UE 115-*a*, base station 105-*a* may transmit an uplink transmission to satellite 145-*a*. Satellite 145-*a* may relay the uplink transmission as a downlink transmission to UE 115-*a* via downlink communication link 205-*b*, which may be referred to as a feeder link. In some other examples, for communications originating at UE 115-*a* and going to base station 105-*a*, UE 115-*a* may transmit an uplink transmission to satellite 145-*a* via a feeder link. Satellite 145-*a* may relay the uplink transmission a as a downlink transmission to base station 105-*a*. In some examples, a cell may be provided or established by satellite 145-*a* as part of the NTN. While the following techniques are described as communications between base station 105-*a* and UE 115-*a*, it should be noted that satellite 145-*a* may alternatively act as a relay node and any communication described as originating from base station 105-*a* may alternatively originate from satellite 145-*a* and transmitted to UE 115-*a* via base station 105-*a*, and vice-versa.

Base station 105-*a* and satellite 145-*a* through satellite 145-*c* may be a large distance (e.g., thousands of kilometers) apart and it may take a long time for electromagnetic waves to propagate over the distance between base station 105-*a*, satellite 145-*a* through satellite 145-*c*, and UE 115-*a*. The propagation delay or frequency shift (e.g., Doppler shift) for NTNs may be many orders of magnitude larger than the propagation delay or frequency shift (e.g., Doppler shift) for terrestrial networks. Additionally or alternatively, high speeds of non-geostationary satellites, such as satellite 145-*a* through satellite 145-*c* may promote propagation delay, Doppler shift, or both. As a result, UE 115-*a* may experience variation in timing synchronization with satellite 145-*a* through satellite 145-*c*.

By way of example, satellite 145-*a* may traverse in an orbit, such as low earth orbit, medium earth orbit, or non-geostationary earth orbit. In any of these examples, satellite 145-*a* may be located a large distance away from earth, and therefore there may be thousands of kilometers of distance between base station 105-*a* and UE 115-*a*. When satellite 145-*a* is located in a low-earth orbit, satellite 145-*a* may be between 600 km to 2000 km from earth and may travel at a rate of 7.5 km/s. In the example of a low earth orbit location of satellite 145-*a*, a 1200 km orbit from earth with an elevation angle of 30°, the round trip delay variation rate may be on the order of 35 microseconds (μs) per second (s) (μs/s). Each transmission between base station 105-*a*, UE 115-*a*, or both and satellite 145-*a* may therefore travel the distance from the earth to satellite 145-*a* and back to the earth. Thus, a distance traveled by a transmission may increase the propagation delay of the transmission. The velocity of satellite 145-*a* may also increase the Doppler shift of a transmission. In some examples, the propagation delay may refer to a duration it takes for a signal to travel from a source to an intended recipient, while the Doppler shift may refer to a change in frequency between transmission and reception of a message.

In some examples, a serving satellite 145, such as satellite 145-a, may know the orbit of neighboring satellites 145 (e.g., satellite 145-b and satellite 145-c). However, satellite 145-a may not know the location of UE 115-a other than for a connecting beam. In some cases, a differential delay within a low earth orbit satellite beam may be 0.7 ms (e.g., with a 1200 km orbit, 30 degree elevation angle, and 6 degree beam angular width). The differential delay between two satellites 145 may be around 2 ms (e.g., assuming a minimal elevation angle of 30 degrees and assuming UE 115-a performs measurements away from the edge of coverage area 110-a). In some examples, a time drift rate for a single antenna may be 25 μs/s, while a time drift rate between two satellites 145 may be 50 μs/s.

In some examples of NTNs, a UE 115 may experience different propagation delays between a serving satellite 145 and neighbor satellites 145. For example, UE 115-a may experience a different propagation delay between satellite 145-a and satellite 145-b, satellite 145-c, or both. In some cases, UE 115-a may receive one or more reference signals, such as synchronization signals in an SSB 210, from serving satellite 145-a or neighboring satellite 145-b, satellite 145-c, or both. For example, UE 115-a may receive one or more SSBs 210 from neighboring satellites 145 when performing a cell search procedure. UE 115-a may perform one or more measurements, such as a reference signal received power (RSRP) measurement, on the SSBs according to a measurement timing configuration 215. For example, UE 115-a may receive one or more SSBs 210 during an SMTC window and may perform one or more measurements during a measurement gap. Base station 105-a, serving satellite 145-a, or both may configure a measurement gap and SMTC window at UE 115-a such that UE 115-a may identify and measure the SSBs 210 within the SMTC window.

In some examples, the SMTC window and measurement gap configuration, which may be referred to as a timing configuration 215, and an SSB receiving window may be different for different cells (e.g., a cell for satellite 145-a, a cell for satellite 145-b, a cell for satellite 145-c, or a combination thereof). In some cases, a UE 115 may be configured with a single measurement gap. For moving satellites 145 with one beam, a larger measurement gap may be sufficient to adjust an SMTC window due to change in delay. However, for a moving satellite 145 with multiple beams, where the UE 115 may keep a same RRC configuration upon beam switch or in a fixed cell where the UE 115 may stay in a same coverage area 110 for several minutes, a timing configuration 215 may become outdated. For example, when a UE 115 to satellite 145 elevation angle changes from 50 degrees to 120 degree, the differential delay may change, and a timing configuration 215 may not be compatible with the new elevation angle.

In some cases, a serving base station 105 or a serving satellite 145 may adjust a timing configuration 215 at a UE 115 over time for measurement of SSBs 210 from one or more satellites 145. For example, base station 105-a may transmit a timing configuration 215 to UE 115-a based on a reference unit, such as a location at a beam center for a respective satellite 145, a threshold distance relative to the beam center for the respective satellite 145, a reference time, or any combination thereof. Additionally or alternatively, satellite 145-a may transmit the timing configuration 215 to UE 115-a based on the reference unit (e.g., if satellite 145-a is acting as a relay for base station 105-a). In some cases, UE 115-a may perform SMTC compensation when monitoring for the SSBs 210, which is described in further detail with respect to FIG. 3.

In some examples, UE 115-a may perform implicit SMTC window adjustment. For example, UE 115-a may search for one or more SSBs 210 in a number of transmission time intervals (TTIs) (e.g., a number, n), such as time slots or subframes, before and after the TTI configured in the timing configuration 215. In some other examples, base station 105-a may explicitly indicate the SMTC window adjustment. For example, base station 105-a may include a drift rate or SMTC window adjustment rate in the timing configuration 215. Additionally or alternatively, base station 105-a may broadcast the drift rate or SMTC window adjustment rate in a system information block (SIB) based on satellite drift, speed, and gateway location. In some cases, UE 115-a may use the explicit indication to adjust a downlink time slot of one or more neighboring satellites 145, such as satellite 145-b, satellite 145-c, or both, to help UE 115-a detect one or more SSBs 210 from the neighboring satellites 145.

In some examples, base station 105-a, satellite 145-a, or both may include an SMTC execution or expiration time in the timing configuration 215 to UE 115-a. For example, if the timing configuration 215 is provided to UE 115-a at a first time, $t_1$, and the network performs SMTC compensation at a future second time, $t_2$, UE 115-a may wait until $t_2$ to use the timing configuration 215. The timing configuration 215 may include a timer that indicates the difference in time between $t_1$ and $t_2$. In some cases, UE 115-a may start the timer based on receiving the timing configuration 215. After expiration of the time, UE 115-a may search for an SSB 210 during a measurement gap or may release the measurement gap configuration indicated in timing configuration 215. In some examples, base station 105-a, satellite 145-a, or both may provide a new timing configuration 215 if UE 115-a releases the measurement gap configuration.

In some examples, UE 115-a may not perform SMTC compensation. For example, an SMTC periodicity and offset may not compensate for a differential delay. UE 115-a may be configured per frequency layer (e.g., one measurement gap per frequency layer or carrier) to measure SSBs 210 from one or more neighboring satellites 145, such as satellite 145-b, satellite 145-c, or both, such that the differential delays of the neighboring satellites 145 from a beam center or a reference location of a serving satellite 145 do not change according to a threshold time (e.g., by x ms, where x is the threshold time). For example, base station 105-a, satellite 145-a, or both may configure x in the timing configuration 215 (e.g., where x may be 2 ms). In some cases, the SMTC window and the measurement gap may accommodate the differential delays. The SMTC window may last from a TTI, n, to plus or minus x (e.g., a time slot (n−x) to (n+x)), where n is the time slot for an SSB 210 of a neighbor satellite 145 considering a beam center as a UE location. Similarly, a measurement gap may be configured from a TTI, n, to plus or minus x. (e.g., (n−x) slot to (n+x) slot). In some cases, the SMTC duration or window may be extended, such as beyond 5 subframes (i.e., to X subframes), which may be aligned with a measurement gap length. In some examples, UE 115-a may monitor for an SSB 210 in each subframe indicated by the SMTC window or timing configuration 215. If the timing configuration 215 does not include the number of subframes, UE 115-a may monitor for the SSB 210 in each subframe during a measurement gap.

In some examples, base station 105-a, satellite 145-a, or both may define multiple SMTC configurations per measurement gap in the timing configuration 215, which is described in further detail with respect to FIG. 4A. In some other examples, base station 105-a, satellite 145-a, or both may define multiple measurement gaps for UE 115-a to measure the SSBs 210 in the timing configuration 215, which is described in further detail with respect to FIG. 4B. In some cases, UE 115-a may adjust a measurement gap according to a rate, which is described in further detail with respect to FIG. 3.

In some cases, UE 115-a may monitor for one or more SSBs 210 from satellite 145-b, one or more SSBs 210 from satellite 145-c, or both. UE 115-a may measure the SSBs 210 according to the measurement gap and SMTC window in the timing configuration 215. In some examples, UE 115-a may perform a cell handover procedure or a cell reselection procedure based on measuring the SSBs 210. For example, UE 115-a may establish communication with satellite 145-b as the serving satellite 145 based on measuring one or more SSBs 210 from satellite 145-b, moving into coverage area 110-b, or both.

Figure 3:
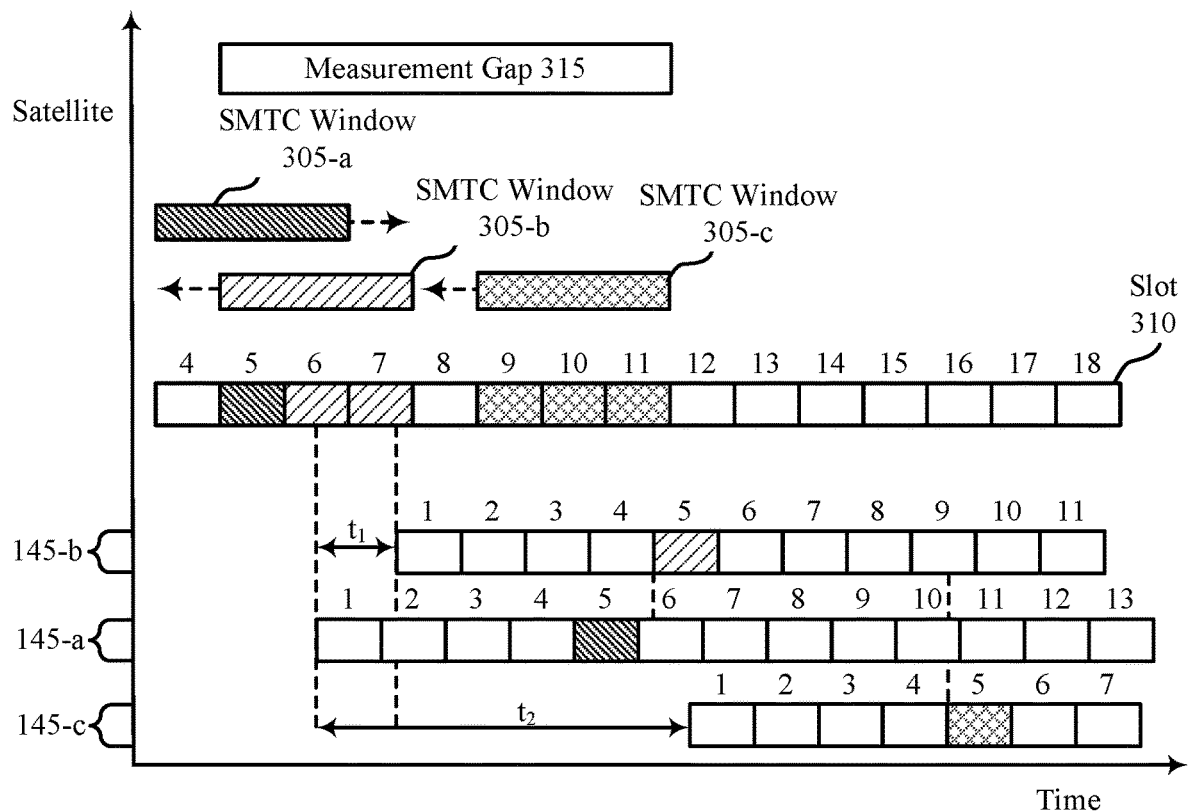

FIG. 3 illustrates an example of a resource diagram 300 that supports timing configuration management for network entities in accordance with aspects of the present disclosure. In some examples, resource diagram 300 may implement aspects of wireless communications system 100 and wireless communications system 200. For example, a UE 115, a base station 105, and one or more satellites 145 may implement resource diagram 300 based on performing SMTC compensation or measurement gap adjustment according to a timing configuration, as described with reference to FIG. 2. In some examples, the UE 115 may receive a timing configuration indicating a differential delay compensation or adjustment for an SMTC window, a measurement gap, or both.

In some cases, a UE 115 may communicate with one or more satellites 145, such as a serving satellite 145-a and one or more neighboring satellites 145, such as satellite 145-b and satellite 145-c, as described with reference to FIG. 2. A base station 105 or satellite 145-a may transmit a timing configuration to the UE 115, which may include information regarding an updated measurement window, such as an SMTC window 305 spanning one or more subframes or slots 310, an updated measurement gap 315, or both. Each satellite 145 may have a respective SMTC window 305, which may span a number of TTIs, such as one or more slots 310 or subframes in a frame. For example, SMTC window 305-a may be for serving satellite 145-a, SMTC window 305-b may be for neighboring satellite 145-b, and SMTC window 305-c may be for neighboring satellite 145-c. The UE 115 may expect to receive one or more SSBs from each satellite 145 during one or more slots 310 of the SMTC window 305. The UE 115 may receive and measure the SSBs for the satellites 145 during a measurement gap 315.

In some cases, the one or more satellites 145 may not know the location of the UE 115. In some examples, the network may include an SMTC periodicity and offset that compensates for a differential delay in the timing configuration. For example, the base station 105 or the satellite 145 may include an SMTC periodicity and offset relative to a beam center (e.g., where uncertainty is 0.7/2=0.35 ms for a periodicity and offset with 1 ms granularity). If a differential delay between serving satellite 145-a and neighbor satellite 145-b is $t_1$ (e.g., 1.2 ms) and a differential delay between satellite 145-a and neighbor satellite 145-c is $t_2$ (e.g., 5.4 ms) at the time the UE 115 receives the timing configuration, then SMTC windows can be subframes or slots 11, 12, and 13 for satellite 145-b and subframes or slots 15, 16, and 17 for satellite 145-c.

In some cases, such as for a moving cell of a satellite 145 with multiple beams, the UE 115 may adjust an SMTC window for each beam switch. The indication of the updated SMTC window, which may be the timing configuration, may be provided in a beam switch command. In some other cases, such as for a fixed cell of a satellite 145, the UE 115 may adjust an SMTC window periodically, for example every X seconds (e.g., where X is 20 seconds).

In some examples, for a moving cell of a satellite 145 with one beam, a larger measurement gap may be sufficient to adjust an SMTC window. Thus, the timing configuration may indicate for the UE 115 to extend a measurement gap 315 to receive and measure SSBs from satellite 145-a, satellite 145-b, satellite 145-c, or a combination thereof. For example, the UE 115 may extend the measurement gap by a duration (e.g., from 6 ms to 7 ms if the duration is 1 ms). However, in a fixed cell for a satellite 145, where the UE 115 may stay in a same cell for several minutes, or in moving cell for a satellite 145 with multiple beams, where the UE 115 may keep a same RRC configuration upon performing a beam switch, a same measurement gap 315 may not be sufficient.

In some cases, the UE 115 may adjust a measurement gap 315 according to a rate. The rate may be in accordance with SMTC window adjustment. In some cases, the network may indicate a timing advance to apply at a constant differential delay change rate to the UE 115 via a base station 105 or serving satellite 145. In some examples, the base station 105 may calculate the differential delay change rate based on a beam center location or a reference location. The measurement gap adjustment rate may be configured in a measurement object for each satellite 145. In some cases, such as for a moving cell with multiple beams, the indication of the measurement gap adjustment rate may be provided to the UE 115 in beam switch command.

In some cases, the base station 105 may transmit a measurement gap validity to the UE 115. After the validity expires, the UE 115 may expect a new measurement gap configuration for SSB measurements. Thus, the base station 105 may transmit an additional timing configuration with an updated measurement gap configuration.

FIGS. 4A and 4B illustrate examples of resource diagrams 400 that support timing configuration management for network entities in accordance with aspects of the present disclosure. In some examples, resource diagram 300 may implement aspects of wireless communications system 100, wireless communications system 200, and resource diagram 300. For example, a UE 115, a base station 105, and one or more satellites 145 may implement resource diagram 400-a based on defining multiple SMTC configurations per measurement gap in a timing configuration. In some other examples, a UE 115, a base station 105, and one or more satellites 145 may implement resource diagram 400-b based on defining multiple measurement gaps for the UE 115 to measure one or more SSBs in the timing configuration.

In some cases, a base station 105, a satellite 145, or both may transmit a timing configuration to a UE 115, as described with reference to FIG. 2. In some cases, as illustrated in FIG. 4A, the timing configuration may include multiple SMTC window configurations per measurement gap, which may have a measurement gap length 405 including one or more subframes in a frame. For example, a measurement gap may include SMTC1 and SMTC2, which may be two different SMTC windows. In some cases, SMTC1 may be an SMTC window for receiving one or more SSBs from satellite 145-b. In some other cases, SMTC2 may be an SMTC window for receiving one or more SSBs from satellite 145-c. The measurement gap may also include additional subframes or slots 410, which may not be included in SMTC1 and SMTC2. In some cases, a base station 105 or network entity may define a list of SMTC window configurations for a list of satellites 145 or cells. In some examples, multiple satellites 145 may share a same SSB frequency, SSB subcarrier spacing, or a measurement object. If the satellites 145 do not share the same SSB frequency, the SSB frequency, the SSB subcarrier spacing, or both may be provided in the list. In some cases, multiple SMTC window configurations per satellite 145 may be defined. In some examples, the list my contain delta signaling of an initial SMTC window configuration or a reference SMTC window configuration. In some cases, a single measurement gap may accommodate the SMTC windows of the satellites 145 provided in the list.

In some cases, as illustrated in FIG. 4B, the timing configuration may include multiple measurement gaps, with measurement gap lengths 405. For example, the timing configuration may include a first measurement gap (MG1) for satellite 145-*b* and a second measurement gap (MG2) for satellite 145-*c*, each with measurement gap lengths 405 (e.g., a same measurement gap length 405 or different measurement gap lengths 405). In some examples, the distance between MG1 and MG2 may be referred to as a gap offset 415. In some cases, the UE 115 may receive one or more SSBs during the measurement gaps. For example, the UE 115 may receive a first SSB (SSB1) from satellite 145-*b* and a second SSB (SSB2) from satellite 145-*c* in gap offset 415.

In some examples, a base station 105 or a serving satellite 145 may signal a list of measurement gap configurations to measure SSBs from different satellites 145 (e.g., satellite 145-*b* and satellite 145-*c*, as described with reference to FIG. 2). Each measurement gap configuration may be mapped to an SSB frequency or measurement object. For example, the base station may add an SSB frequency or measurement object identifier (ID) in the measurement gap list or may provide the measurement gap list in a same order as the measurement object list. In some cases, a base station 105 or a serving satellite 145 may signal a list of measurement gap parameters. For example, the list of parameters may include a gap offset 415, a gap time advance, a gap repetition periodicity for a repetition period 420, a gap duration, or a combination thereof. Each measurement gap parameter may be mapped to an SSB frequency or measurement object.

In some cases, the timing configuration including the measurement gaps and additional slots 410 surrounding the measurement gaps may be repeated according to a repetition period 420. In some examples, the timing configuration may define new values of the measurement gap repetition period 420 (e.g., greater than 160 ms) or measurement gap timing advance (e.g., greater than 0.5 ms) to accommodate multiple measurement gaps with sufficient gap offset 415 (e.g., gap between different measurement gaps).

Figure 5:
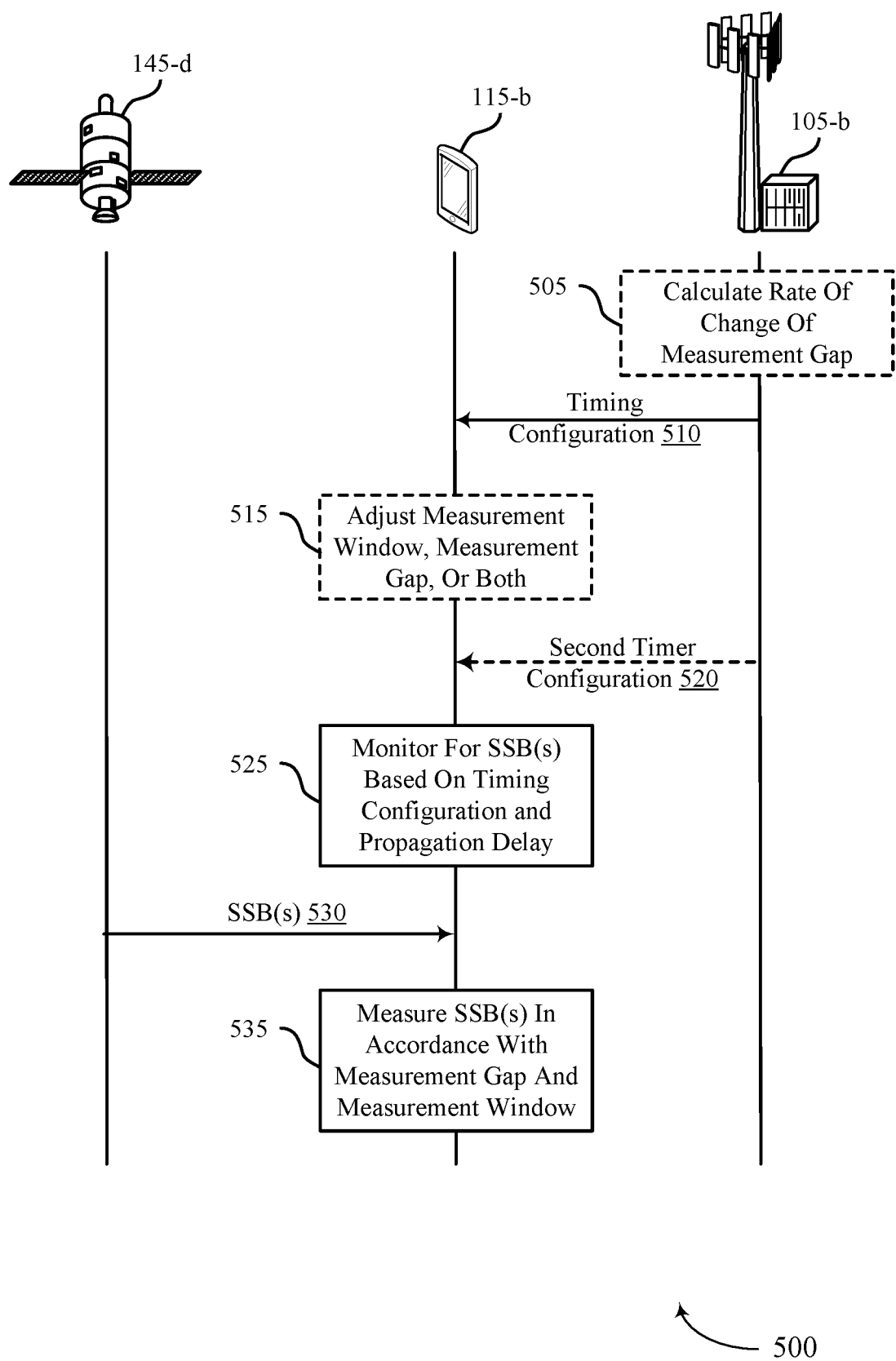
FIG. 5 illustrates an example of a process flow that supports timing configuration management for network entities in accordance with aspects of the present disclosure.

FIG. 5 illustrates an example of a process flow 500 that supports timing configuration management for network entities in accordance with aspects of the present disclosure. In some examples, process flow 500 may implement aspects of wireless communications system 100, wireless communications system 200, resource diagram 300, and resource diagrams 400. The process flow 500 may illustrate an example of a base station 105-*b*, which may be an example of a base station 105 or a serving satellite 145 as described with reference to FIG. 1, transmitting a timing configuration to a UE 115 to adjust a measurement window, a measurement gap, or both for measuring SSBs from neighboring satellites 145, such as satellite 145-*d*. Alternative examples of the following may be implemented, where some processes are performed in a different order than described or are not performed. In some cases, processes may include additional features not mentioned below, or further processes may be added.

In some examples, base station 105-*b* may be an example of a terrestrial base station 105. In some other examples, base station 105-*b* may be a non-terrestrial device, such as a serving satellite 145 acting as a base station 105-*b*. In some examples, the terrestrial base station 105 may communicate with a serving satellite 145 to communicate signaling to UE 115-*b* (e.g., where the serving satellite 145 may act as a relay). In some cases, UE 115-*b* may perform a cell reselection of cell handover procedure based on measuring one or more SSBs from neighboring satellites 145 according to a timing configuration, such as a measurement window (e.g., an SMTC window) and a measurement gap. However, there may be a propagation delay between UE 115-*b* and satellite 145-*d*.

At 505, base station 105-*b* may calculate a rate of change of the measurement gap for each of the one or more SSBs. The SSBs may be from satellite 145-*d*, additional neighboring satellites 145, or both.

At 510, base station 105-*b* may transmit an indication of a timing configuration for UE 115-*b* to UE 115-*b* based on a reference unit. In some cases, UE 115-*b*, base station 105-*b*, or both may determine the reference unit includes a reference location at a beam center for satellite 145-*d*, a threshold distance relative to the beam center for satellite 145-*d*, a reference time, or a combination thereof. In some examples, the timing configuration may include information for a measurement window and a measurement gap for measuring one or more SSBs. The SSBs may be from a set of satellites 145 including satellite 145-*d*. In some cases, UE 115-*b* may use the measurement window, the measurement gap, or both to monitor for SSBs from one or more satellites 145.

In some examples, the timing configuration may include one or more parameters for respective propagation delays from different satellites 145, including a propagation delay from satellite 145-*d*, with respect to the reference unit. The one or more parameters may include one or more of a periodicity, an offset, a drift rate, a measurement window adjustment rate, or a combination thereof for a drift of one or more of the neighboring satellites 145, a speed of one or more of the neighboring satellites 145, or a gateway location of UE 115-*b*.

In some cases, the timing configuration may include a control message indicating a measurement window and a measurement gap, where the indicated measurement window, the indicated measurement gap, or both are based on one or more defined differential propagation delays for the set of satellites 145. In some examples, the timing configuration may include multiple measurement window configurations for a single measurement gap. The measurement window configurations may include a list of measurement window configurations for each of the satellites 145 in a list of satellites 145 including satellite 145-*d*. In some cases, the satellites 145 may share an SSB frequency, a subcarrier spacing, a measurement object, or any combination thereof for communications with UE 115-*b*. The list of measurement window configurations may include an SSB frequency, a subcarrier spacing, a delta signaling of a reference measurement window configuration, or a combination thereof corresponding to the satellites 145. In some examples, the measurement window configurations in the list may be for base station 105-*b*, which may serve the satellites 145.

In some examples, the timing configuration may include an indication of multiple measurement gap configurations for the one or more SSBs. The indication of the measurement gap configurations may include a list of measurement gap configurations. Each measurement gap configuration in the list having an SSB frequency, a measurement object identifier, or both. In some cases, the indication of the measurement gap configurations may include a list of measurement gap parameters. The measurement gap parameters may be at least one of a gap offset, a gap time advance, a gap repetition periodicity, a gap duration, or a combination thereof for an SSB frequency, a measurement object identifier, or both. In some examples, the indication of the measurement gap configurations may indicate a value of a measurement gap repetition period, a measurement gap timing advance, or both.

In some cases, the timing configuration may include an indication of a rate of change of the measurement gap based on the respective propagation delay for satellite 145-*d*. The rate of change may be calculated at 505. In some cases, UE 115-*b* may receive a beam switch message including the indication of the rate of change of the measurement gap. In some examples, UE 115-*b* may receive a validity flag for the measurement gap from base station 105-*b*. The validity flag may indicate that the measurement gap is invalid after a validity period. In some examples, UE 115-*b* may receive the validity flag in the timing configuration.

In some examples, base station 105-*b* may include the timing configuration in a SIB. The SIB may indicate the timing configuration or one or more measurement window adjustment parameters.

At 515, UE 115-*b* may adjust a measurement window, a measurement gap, or both. For example, UE 115-*b* may adjust the measurement gap according to the rate of change of the measurement gap. In some cases, UE 115-*b* may receive a beam switch message indicating the timing configuration and may adjust the measurement window, the measurement gap, or both based on the received indication of the timing configuration and the received beam switch message. In some cases, UE 115-*b* may receive an indication of a timer associated with a periodicity for adjustment of the measurement window, the measurement gap, or both. UE 115-*b* may adjust the measurement window, the measurement gap, or both based on expiration of the timer.

At 520, UE 115-*b* may receive an indication of a second timing configuration. For example, UE 115-*b* may receive the second timing configuration based on the validity flag indicating that the measurement gap is invalid. In some other examples, UE 115-*b* may receive the second timing configuration based on the expiration of the timer. In some cases, the second timing configuration may indicate the adjusted measurement window, the adjusted measurement gap, or both.

At 525, UE 115-*b* may monitor for one or more SSBs from neighboring satellites 145-*d*, including satellite 145-*d*, based on the timing configuration and a respective propagation delay between UE 115-*b* and each satellite 145 transmitting the one or more SSBs. In some cases, UE 115-*b* may monitor for the one or more SSBs based on the adjusted measurement window, the adjusted measurement gap, or both. In some examples, UE 115-*b* monitors for the one or more SSBs during the indicated measurement window, the indicated measurement gap, or both. In some examples, UE 115-*b* may monitor for the one or more SSBs in a time slot indicated by the timing configuration and at least one other time slot adjacent to the indicated time slot, where the time slot may be a TTI.

At 530, UE 115-*b* may receive one or more SSBs from one or more satellites 145 that neighbor a serving satellite 145. For example, UE 115-*b* may receive one or more SSBs from neighboring satellite 145-*d*.

At 535, UE 115-*b* may measure at least one of the SSBs in accordance with the measurement gap and the measurement window based on the monitoring and the respective propagation delay. In some cases, UE 115-*b* and satellite 145-*d* are nodes in an NTN.

Figure 6:
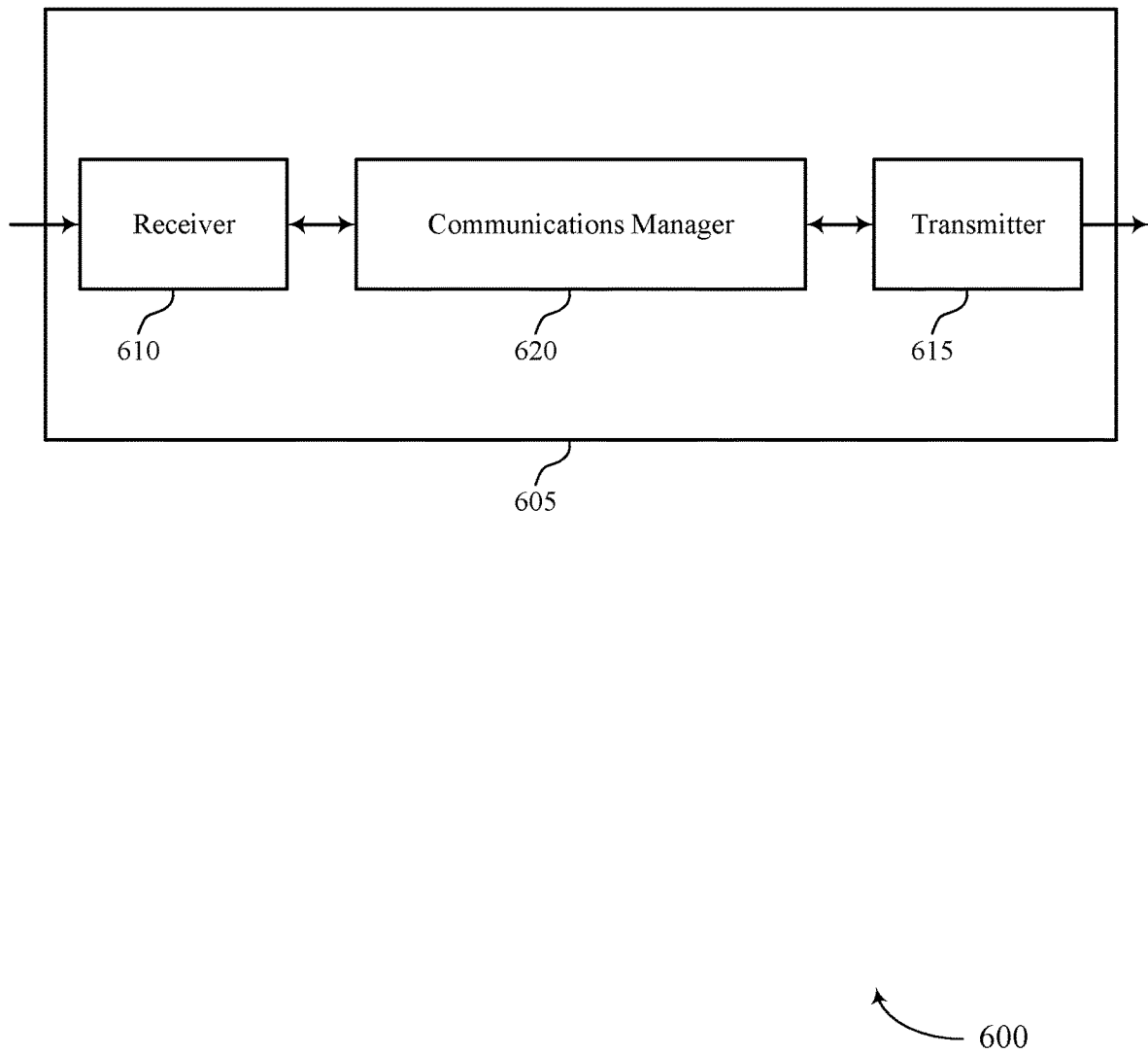
FIGS. 6 and 7 show block diagrams of devices that support timing configuration management for network entities in accordance with aspects of the present disclosure.

FIG. 6 shows a block diagram 600 of a device 605 that supports timing configuration management for network entities in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to timing configuration management for network entities). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to timing configuration management for network entities). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of timing configuration management for network entities as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. For example, the communications manager 620 may be configured as or otherwise support a means for receiving, from a base station, an indication of a timing configuration for the UE based on a reference unit, the timing configuration corresponding to a measurement window and a measurement gap for measuring one or more SSBs from a set of satellites each associated with one or more satellites. The communications manager 620 may be configured as or otherwise support a means for monitoring for the one or more SSBs based on the timing configuration and a respective propagation delay between the UE and a respective satellite of the set of satellites associated with the one or more SSBs. The communications manager 620 may be configured as or otherwise support a means for measuring at least one of the one or more SSBs in accordance with the measurement gap and the measurement window based on the monitoring and the respective propagation delay.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for a base station to transmit a timing configuration to a UE that may adjust a measurement window, a measurement gap, or both for receiving SSBs from one or more satellites, which may reduce processing, reduce power consumption, cause more efficient utilization of communication resources, and the like.

Figure 7:
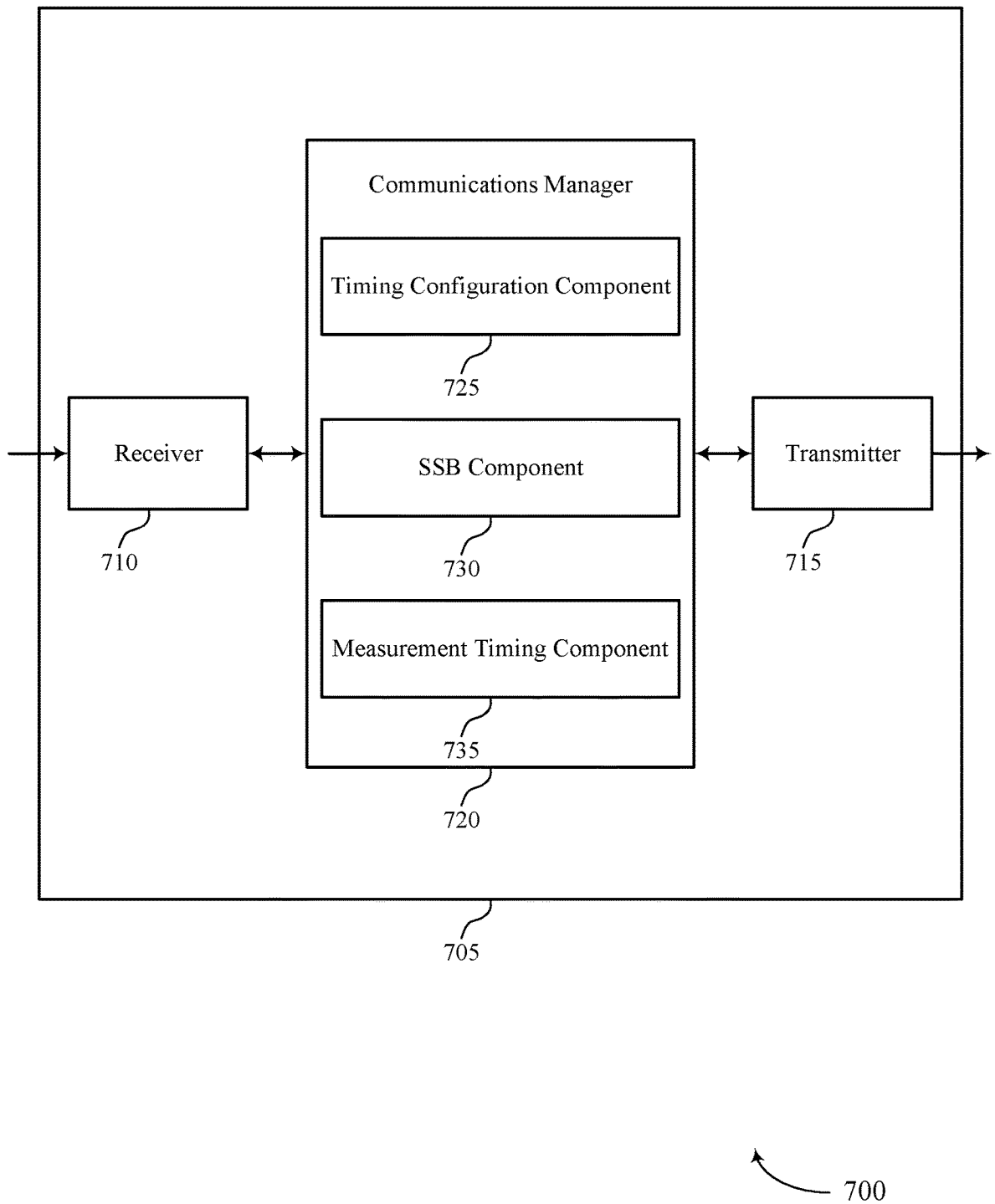

FIG. 7 shows a block diagram 700 of a device 705 that supports timing configuration management for network entities in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to timing configuration management for network entities). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to timing configuration management for network entities). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of timing configuration management for network entities as described herein. For example, the communications manager 720 may include a timing configuration component 725, an SSB component 730, a measurement timing component 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a UE in accordance with examples as disclosed herein. The timing configuration component 725 may be configured as or otherwise support a means for receiving, from a base station, an indication of a timing configuration for the UE based on a reference unit, the timing configuration corresponding to a measurement window and a measurement gap for measuring one or more SSBs from a set of satellites each associated with one or more satellites. The SSB component 730 may be configured as or otherwise support a means for monitoring for the one or more SSBs based on the timing configuration and a respective propagation delay between the UE and a respective satellite of the set of satellites associated with the one or more SSBs. The measurement timing component 735 may be configured as or otherwise support a means for measuring at least one of the one or more SSBs in accordance with the measurement gap and the measurement window based on the monitoring and the respective propagation delay.

Figure 8:
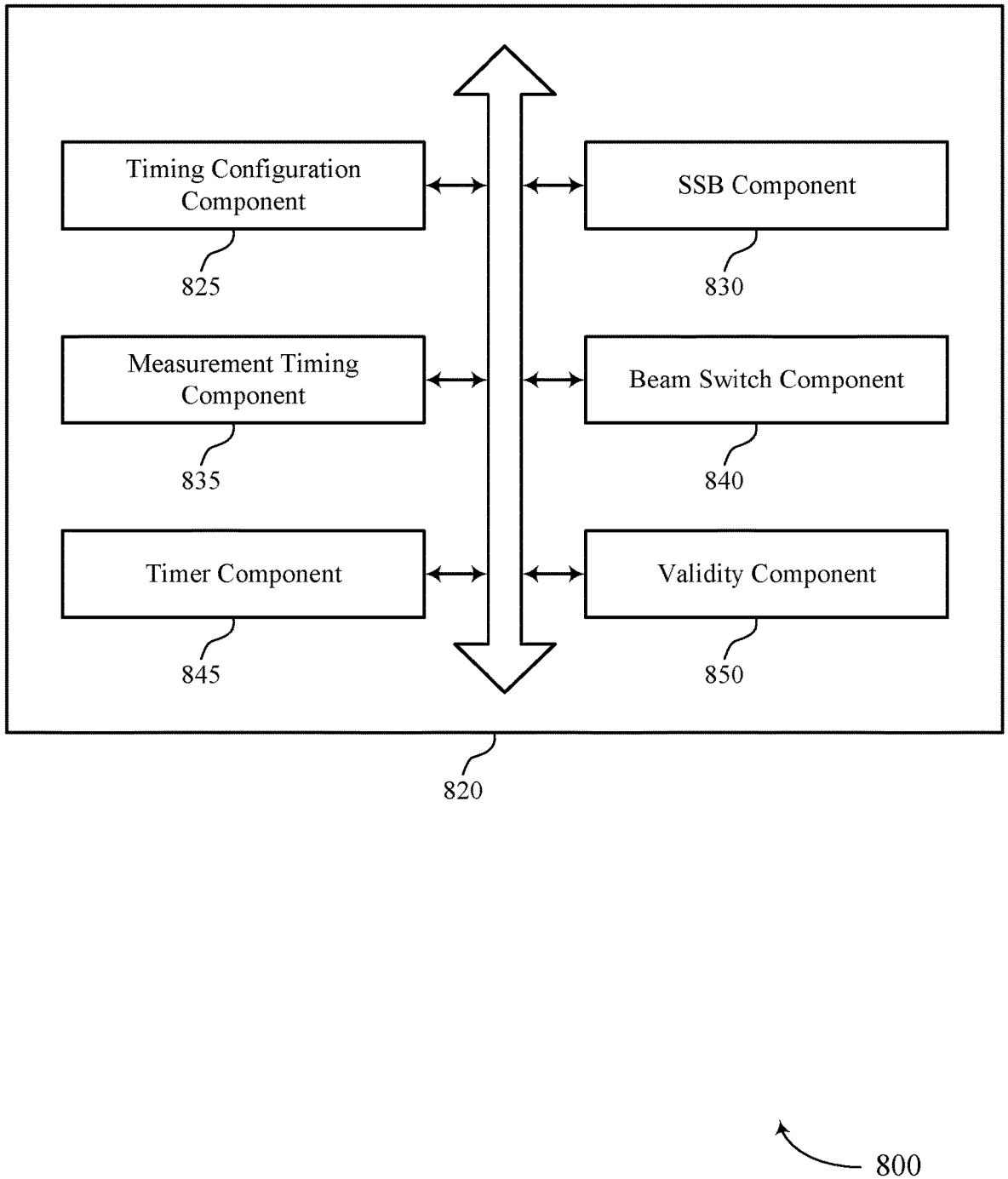
FIG. 8 shows a block diagram of a communications manager that supports timing configuration management for network entities in accordance with aspects of the present disclosure.

FIG. 8 shows a block diagram 800 of a communications manager 820 that supports timing configuration management for network entities in accordance with aspects of the present disclosure. The communications manager 820 may be an example of aspects of a communications manager 620, a communications manager 720, or both, as described herein. The communications manager 820, or various components thereof, may be an example of means for performing various aspects of timing configuration management for network entities as described herein. For example, the communications manager 820 may include a timing configuration component 825, an SSB component 830, a measurement timing component 835, a beam switch component 840, a timer component 845, a validity component 850, or any combination thereof. Each of these components may communicate, directly or indirectly, with one another (e.g., via one or more buses).

The communications manager 820 may support wireless communications at a UE in accordance with examples as disclosed herein. The timing configuration component 825 may be configured as or otherwise support a means for receiving, from a base station, an indication of a timing configuration for the UE based on a reference unit, the timing configuration corresponding to a measurement window and a measurement gap for measuring one or more SSBs from a set of satellites each associated with one or more satellites. The SSB component 830 may be configured as or otherwise support a means for monitoring for the one or more SSBs based on the timing configuration and a respective propagation delay between the UE and a respective satellite of the set of satellites associated with the one or more SSBs. The measurement timing component 835 may be configured as or otherwise support a means for measuring at least one of the one or more SSBs in accordance with the measurement gap and the measurement window based on the monitoring and the respective propagation delay.

In some examples, the timing configuration component 825 may be configured as or otherwise support a means for determining the reference unit includes a reference location at a beam center associated with the respective satellite, a threshold distance relative to the beam center associated with the respective satellite, a reference time, or any combination thereof.

In some examples, to support receiving the indication of the timing configuration, the timing configuration component 825 may be configured as or otherwise support a means for receiving, from the base station, a message including one or more parameters corresponding to the respective propagation delays from different satellites with respect to the reference unit.

In some examples, a periodicity, an offset, a drift rate, a measurement window adjustment rate, or a combination thereof corresponding to a drift of one or more of the set of satellites, a speed of one or more of the set of satellites, or a gateway location of the UE.

In some examples, the beam switch component 840 may be configured as or otherwise support a means for receiving a beam switch message indicating the timing configuration. In some examples, the beam switch component 840 may be configured as or otherwise support a means for adjusting the measurement window, the measurement gap, or both based on the received indication of the timing configuration and the received beam switch message.

In some examples, the timer component 845 may be configured as or otherwise support a means for receiving an indication of a timer associated with a periodicity for adjustment of the measurement window, the measurement gap, or both. In some examples, the timer component 845 may be configured as or otherwise support a means for adjusting the measurement window, the measurement gap, or both based on expiration of the timer, where monitoring for the one or more SSBs is based on the adjusted measurement window, the adjusted measurement gap, or both.

In some examples, the timing configuration component 825 may be configured as or otherwise support a means for receiving an indication of a second timing configuration based on the expiration of the timer, the second timing configuration indicating the adjusted measurement window, the adjusted measurement gap, or both.

In some examples, to support monitoring for the one or more SSBs, the SSB component 830 may be configured as or otherwise support a means for monitoring for the one or more SSBs in a time slot indicated by the timing configuration and at least one other time slot adjacent to the indicated time slot.

In some examples, to support receiving the indication of the timing configuration, the timing configuration component 825 may be configured as or otherwise support a means for receiving, from the base station, a control message indicating the measurement window and the measurement gap, where the indicated measurement window, the indicated measurement gap, or both are based on one or more defined differential propagation delays corresponding to the set of satellites, and where the one or more SSBs are monitored during the indicated measurement window, the indicated measurement gap, or both.

In some examples, to support receiving the indication of the timing configuration, the timing configuration component 825 may be configured as or otherwise support a means for receiving, from the base station, a set of multiple measurement window configurations corresponding to a single measurement gap, where the set of multiple measurement window configurations includes a list of measurement window configurations corresponding to a set of multiple satellites including the set of satellites.

In some examples, the one or more satellites of the set of satellites share an SSB frequency, a subcarrier spacing, a measurement object, or any combination thereof for communications with the UE.

In some examples, the list of measurement window configurations includes an SSB frequency, a subcarrier spacing, a delta signaling of a reference measurement window configuration, or a combination thereof corresponding to the set of satellites.

In some examples, the set of multiple measurement window configurations of the list of measurement window configurations corresponds to a single base station serving the set of satellites.

In some examples, to support receiving the indication of the timing configuration, the measurement timing component 835 may be configured as or otherwise support a means for receiving, from the base station, an indication of a set of multiple measurement gap configurations corresponding to the one or more SSBs.

In some examples, the indication of the set of multiple measurement gap configurations includes a list of measurement gap configurations, each measurement gap configuration in the list of measurement gap configurations corresponding to an SSB frequency, a measurement object identifier, or both.

In some examples, the indication of the set of multiple measurement gap configurations includes a list of measurement gap parameters including a gap offset, a gap time advance, a gap repetition periodicity, a gap duration, or a combination thereof corresponding to an SSB frequency, a measurement object identifier, or both.

In some examples, the indication of the set of multiple measurement gap configurations indicates a value of a measurement gap repetition period, a measurement gap timing advance, or both.

In some examples, to support receiving the indication of the timing configuration, the measurement timing component 835 may be configured as or otherwise support a means for receiving an indication of a rate of change of the measurement gap based on the respective propagation delay. In some examples, to support receiving the indication of the timing configuration, the measurement timing component 835 may be configured as or otherwise support a means for adjusting the measurement gap according to the rate of change of the measurement gap.

In some examples, the beam switch component 840 may be configured as or otherwise support a means for receiving a beam switch message including the indication of the rate of change of the measurement gap.

In some examples, the validity component 850 may be configured as or otherwise support a means for receiving a validity flag for the measurement gap from the base station, the validity flag indicating that the measurement gap is invalid after a validity period. In some examples, the validity component 850 may be configured as or otherwise support a means for receiving an indication of a second timing configuration based on the validity flag indicating that the measurement gap is invalid.

In some examples, to support receiving the indication of the timing configuration, the timing configuration component 825 may be configured as or otherwise support a means for receiving, from the base station, a SIB that indicates the timing configuration or one or more measurement window adjustment parameters.

In some examples, the UE, the satellite, the set of satellites, or a combination thereof are nodes in an NTN.

Figure 9:
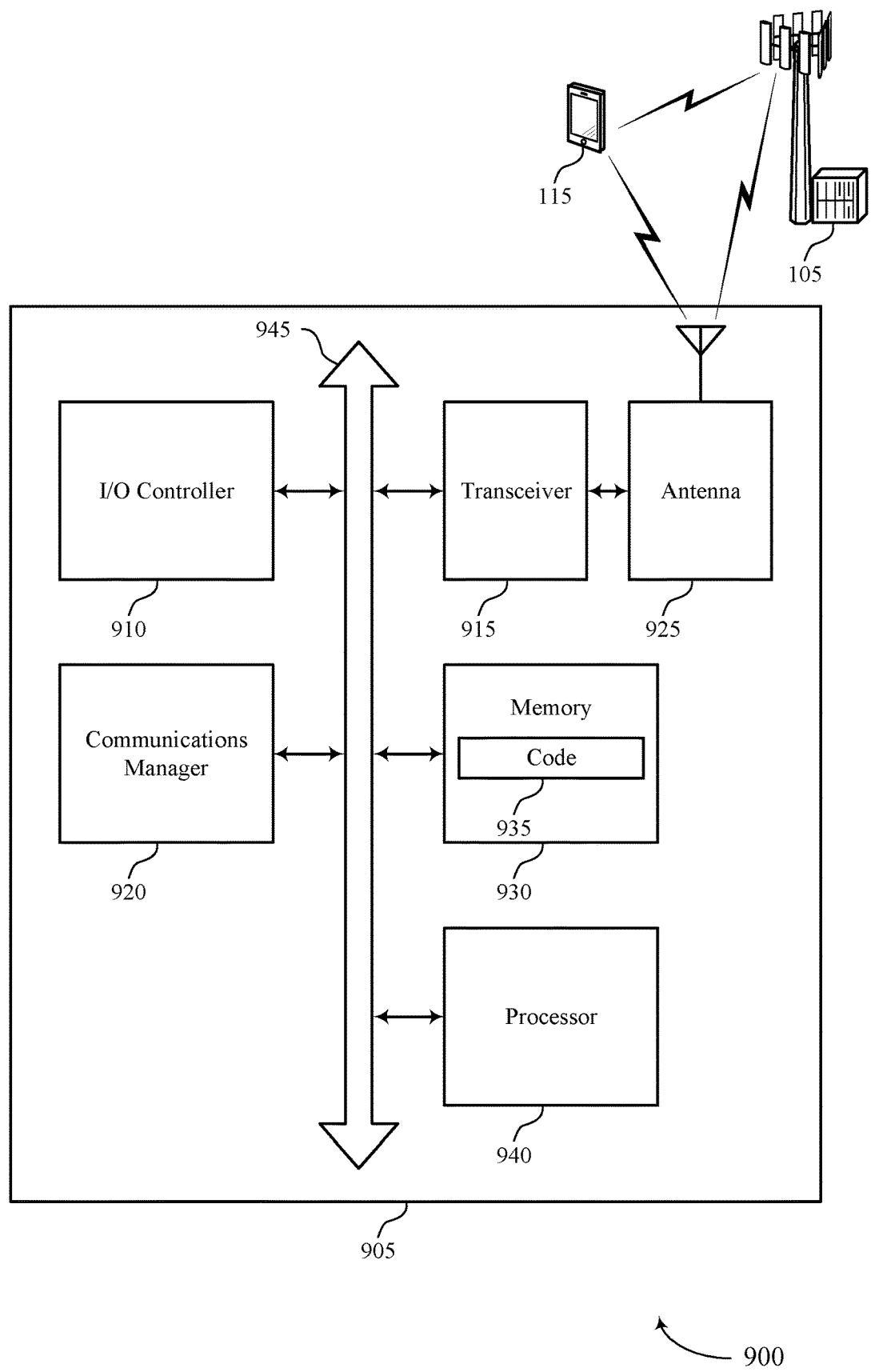
FIG. 9 shows a diagram of a system including a device that supports timing configuration management for network entities in accordance with aspects of the present disclosure.

FIG. 9 shows a diagram of a system 900 including a device 905 that supports timing configuration management for network entities in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting timing configuration management for network entities). For example, the device 905 or a component of the device 905 may include a processor 940 and memory 930 coupled to the processor 940, the processor 940 and memory 930 configured to perform various functions described herein.

The communications manager 920 may support wireless communications at a UE in accordance with examples as disclosed herein. For example, the communications manager 920 may be configured as or otherwise support a means for receiving, from a base station, an indication of a timing configuration for the UE based on a reference unit, the timing configuration corresponding to a measurement window and a measurement gap for measuring one or more SSBs from a set of satellites each associated with one or more satellites. The communications manager 920 may be configured as or otherwise support a means for monitoring for the one or more SSBs based on the timing configuration and a respective propagation delay between the UE and a respective satellite of the set of satellites associated with the one or more SSBs. The communications manager 920 may be configured as or otherwise support a means for measuring at least one of the one or more SSBs in accordance with the measurement gap and the measurement window based on the monitoring and the respective propagation delay.

By including or configuring the communications manager 920 in accordance with examples as described herein, the device 905 may support techniques for a base station to transmit a timing configuration to a UE that may adjust a measurement window, a measurement gap, or both for receiving SSBs from one or more satellites, which may improve communication reliability, reduce latency, improve user experience related to reduced processing, reduce power consumption, cause more efficient utilization of communication resources, improve coordination between devices, increase battery life, improve utilization of processing capability, and the like.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of timing configuration management for network entities as described herein, or the processor 940 and the memory 930 may be otherwise configured to perform or support such operations.

Figure 10:
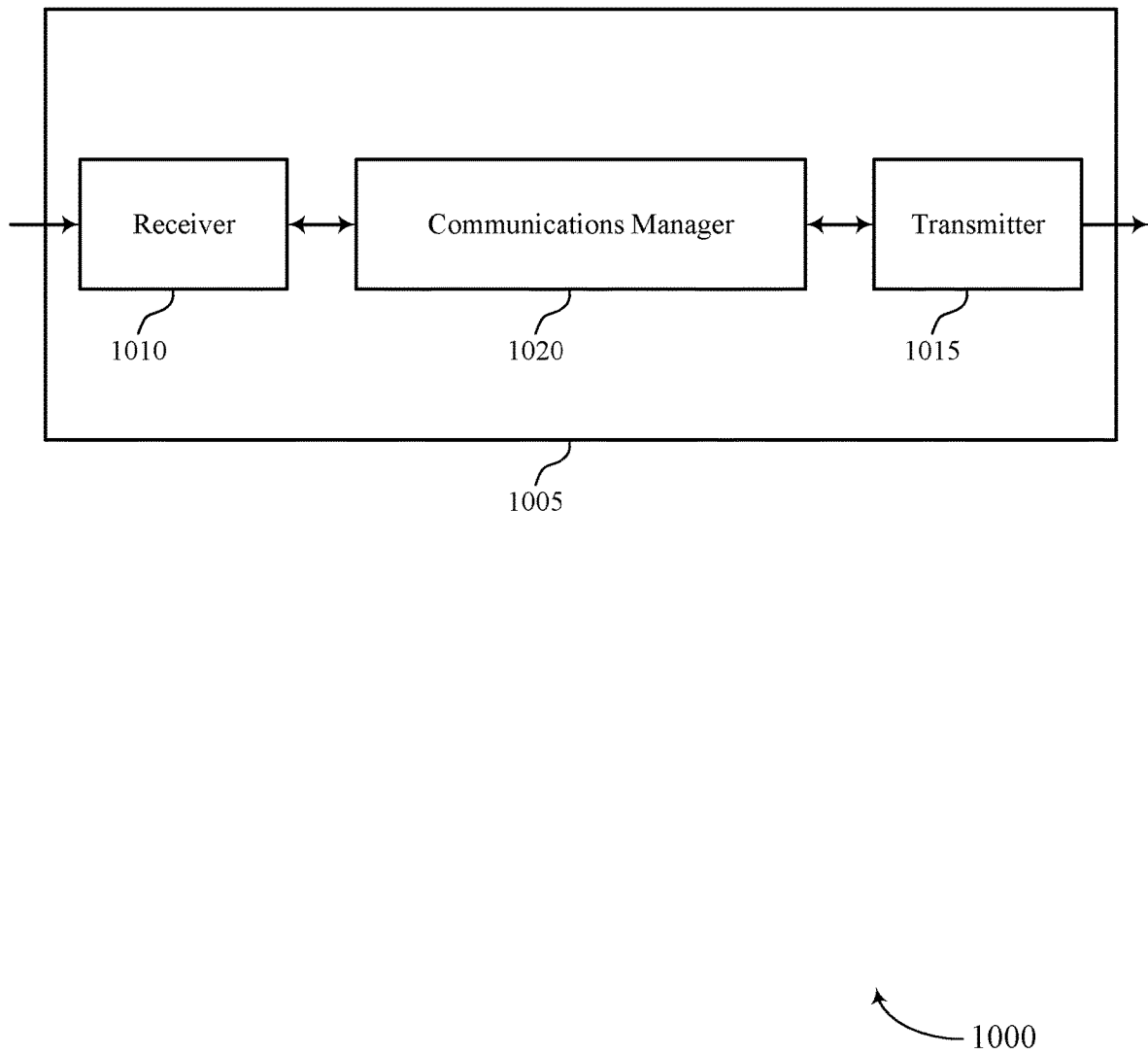
FIGS. 10 and 11 show block diagrams of devices that support timing configuration management for network entities in accordance with aspects of the present disclosure.

FIG. 10 shows a block diagram 1000 of a device 1005 that supports timing configuration management for network entities in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to timing configuration management for network entities). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to timing configuration management for network entities). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of timing configuration management for network entities as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. For example, the communications manager 1020 may be configured as or otherwise support a means for transmitting, to a UE, an indication of a timing configuration for the UE based on a reference unit, the timing configuration corresponding to a measurement window and a measurement gap for measuring one or more SSBs from a set of satellites, each satellite of the set of satellites associated with the base station. The communications manager 1020 may be configured as or otherwise support a means for transmitting the one or more SSBs based on the measurement gap, the measurement window, and a respective propagation delay between the UE and a satellite of the set of satellites.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for a base station to transmit a timing configuration to a UE that may adjust a measurement window, a measurement gap, or both for receiving SSBs from one or more satellites, which may reduce processing, reduce power consumption, cause more efficient utilization of communication resources, and the like.

Figure 11:
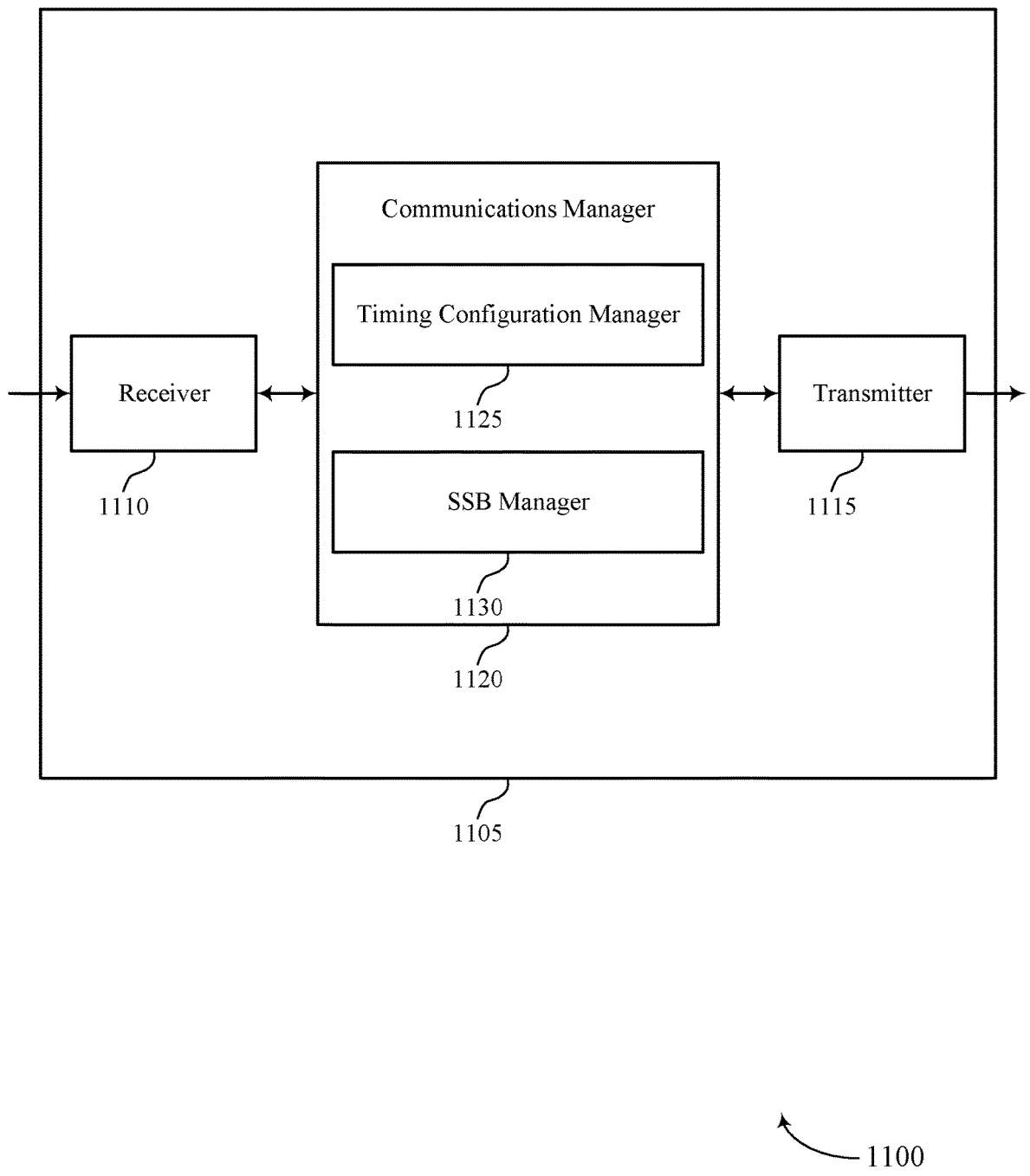

FIG. 11 shows a block diagram 1100 of a device 1105 that supports timing configuration management for network entities in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to timing configuration management for network entities). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to timing configuration management for network entities). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of timing configuration management for network entities as described herein. For example, the communications manager 1120 may include a timing configuration manager 1125 an SSB manager 1130, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a base station in accordance with examples as disclosed herein. The timing configuration manager 1125 may be configured as or otherwise support a means for transmitting, to a UE, an indication of a timing configuration for the UE based on a reference unit, the timing configuration corresponding to a measurement window and a measurement gap for measuring one or more SSBs from a set of satellites, each satellite of the set of satellites associated with the base station. The SSB manager 1130 may be configured as or otherwise support a means for transmitting the one or more SSBs based on the measurement gap, the measurement window, and a respective propagation delay between the UE and a satellite of the set of satellites.

Figure 12:
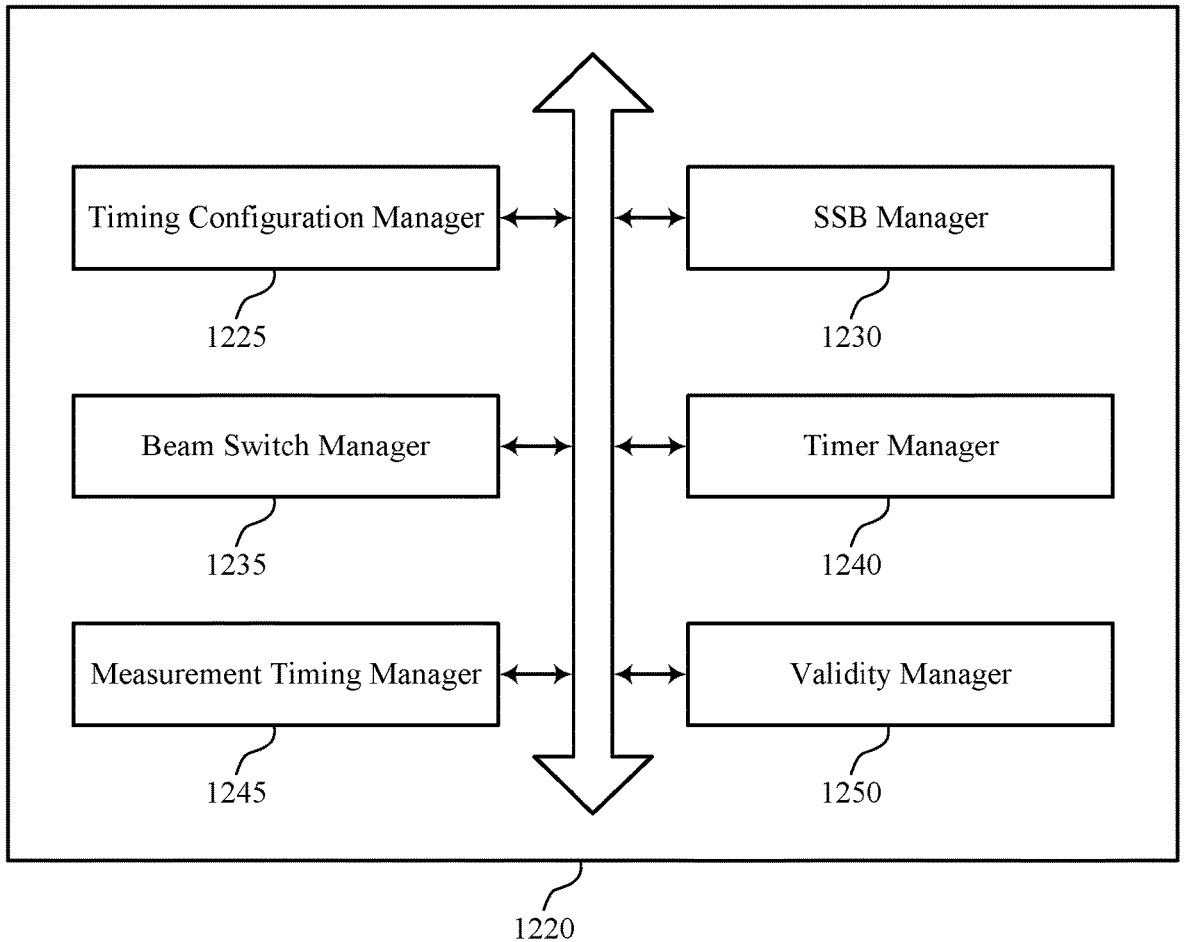
FIG. 12 shows a block diagram of a communications manager that supports timing configuration management for network entities in accordance with aspects of the present disclosure.

FIG. 12 shows a block diagram 1200 of a communications manager 1220 that supports timing configuration management for network entities in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of timing configuration management for network entities as described herein. For example, the communications manager 1220 may include a timing configuration manager 1225, an SSB manager 1230, a beam switch manager 1235, a timer manager 1240, a measurement timing manager 1245, a validity manager 1250, or any combination thereof. Each of these components may communicate, directly or indirectly, with one another (e.g., via one or more buses).

The communications manager 1220 may support wireless communication at a base station in accordance with examples as disclosed herein. The timing configuration manager 1225 may be configured as or otherwise support a means for transmitting, to a UE, an indication of a timing configuration for the UE based on a reference unit, the timing configuration corresponding to a measurement window and a measurement gap for measuring one or more SSBs from a set of satellites, each satellite of the set of satellites associated with the base station. The SSB manager 1230 may be configured as or otherwise support a means for transmitting the one or more SSBs based on the measurement gap, the measurement window, and a respective propagation delay between the UE and a satellite of the set of satellites.

In some examples, the timing configuration manager 1225 may be configured as or otherwise support a means for determining the reference unit includes a reference location at a beam center associated with the satellite, around the beam center associated with the satellite, a reference time, or any combination thereof.

In some examples, to support transmitting the indication of the timing configuration, the timing configuration manager 1225 may be configured as or otherwise support a means for transmitting, to the UE, a message including one or more parameters corresponding to the respective propagation delays from different satellites with respect to the reference unit.

In some examples, the one or more parameters include a periodicity, an offset, a drift rate, a measurement window adjustment rate, or a combination thereof corresponding to a drift of the set of satellites, a speed of the set of satellites, or a gateway location of the UE.

In some examples, the beam switch manager 1235 may be configured as or otherwise support a means for transmitting a beam switch message indicating the timing configuration.

In some examples, the timer manager 1240 may be configured as or otherwise support a means for transmitting an indication of a timer associated with a periodicity for adjustment of the measurement window, the measurement gap, or both.

In some examples, the timing configuration manager 1225 may be configured as or otherwise support a means for transmitting an indication of a second timing configuration based on expiration of the timer, the second timing configuration indicating an adjusted measurement window, an adjusted measurement gap, or both.

In some examples, to support transmitting the indication of the timing configuration, the measurement timing manager 1245 may be configured as or otherwise support a means for transmitting, to the UE, a control message indicating the measurement window and the measurement gap, where the indicated measurement window, the indicated measurement gap, or both are based on one or more defined differential propagation delays corresponding to the set of satellites, and where the one or more SSBs are transmitted during the indicated measurement window, the indicated measurement gap, or both.

In some examples, to support transmitting the indication of the timing configuration, the measurement timing manager 1245 may be configured as or otherwise support a means for transmitting, to the UE, a set of multiple measurement window configurations corresponding to a single measurement gap, where the set of multiple measurement window configurations includes a list of measurement window configurations corresponding to a set of multiple satellites including the set of satellites.

In some examples, the set of satellites share an SSB frequency, a subcarrier spacing, a measurement object, or any combination thereof for communications with the UE.

In some examples, the list of measurement window configurations includes an SSB frequency, a subcarrier spacing, a delta signaling of a reference measurement window configuration, or any combination thereof corresponding to the set of satellites.

In some examples, the set of multiple measurement window configurations on the list of measurement window configurations correspond to a single base station serving the set of satellites.

In some examples, to support transmitting the indication of the timing configuration, the SSB manager 1230 may be configured as or otherwise support a means for transmitting, to the UE, an indication of a set of multiple measurement gap configurations corresponding to the one or more SSBs.

In some examples, the indication of the set of multiple measurement gap configurations includes a list of measurement gap configurations, each measurement gap configuration in the list of measurement gap configurations corresponding to an SSB frequency, a measurement object identifier, or both.

In some examples, the indication of the set of multiple measurement gap configurations includes a list of measurement gap parameters including a gap offset, a gap time advance, a gap repetition periodicity, a gap duration, or any combination thereof corresponding to an SSB frequency, a measurement object identifier, or both.

In some examples, the indication of the set of multiple measurement gap configurations indicates a value of a measurement gap repetition period, a measurement gap timing advance, or both.

In some examples, to support transmitting the indication of the timing configuration, the measurement timing manager 1245 may be configured as or otherwise support a means for calculating a rate of change of the measurement gap for each of the one or more SSBs. In some examples, to support transmitting the indication of the timing configuration, the measurement timing manager 1245 may be configured as or otherwise support a means for transmitting an indication of the calculated rate of change of the measurement gap based on the respective propagation delay.

In some examples, the beam switch manager 1235 may be configured as or otherwise support a means for transmitting a beam switching message including the indication of the rate of change of the measurement gap.

In some examples, the validity manager 1250 may be configured as or otherwise support a means for transmitting, to the UE, a validity flag for the measurement gap, the validity flag indicating that the measurement gap is invalid after a validity period. In some examples, the timing configuration manager 1225 may be configured as or otherwise support a means for transmitting an indication of a second timing configuration based on the validity flag indicating that the measurement gap is invalid.

In some examples, to support transmitting the indication of the timing configuration, the timing configuration manager 1225 may be configured as or otherwise support a means for transmitting, to the UE, a SIB that indicates the timing configuration or one or more measurement window adjustment parameters.

In some examples, the UE, the satellite, the set of satellites, or a combination thereof are nodes in an NTN.

Figure 13:
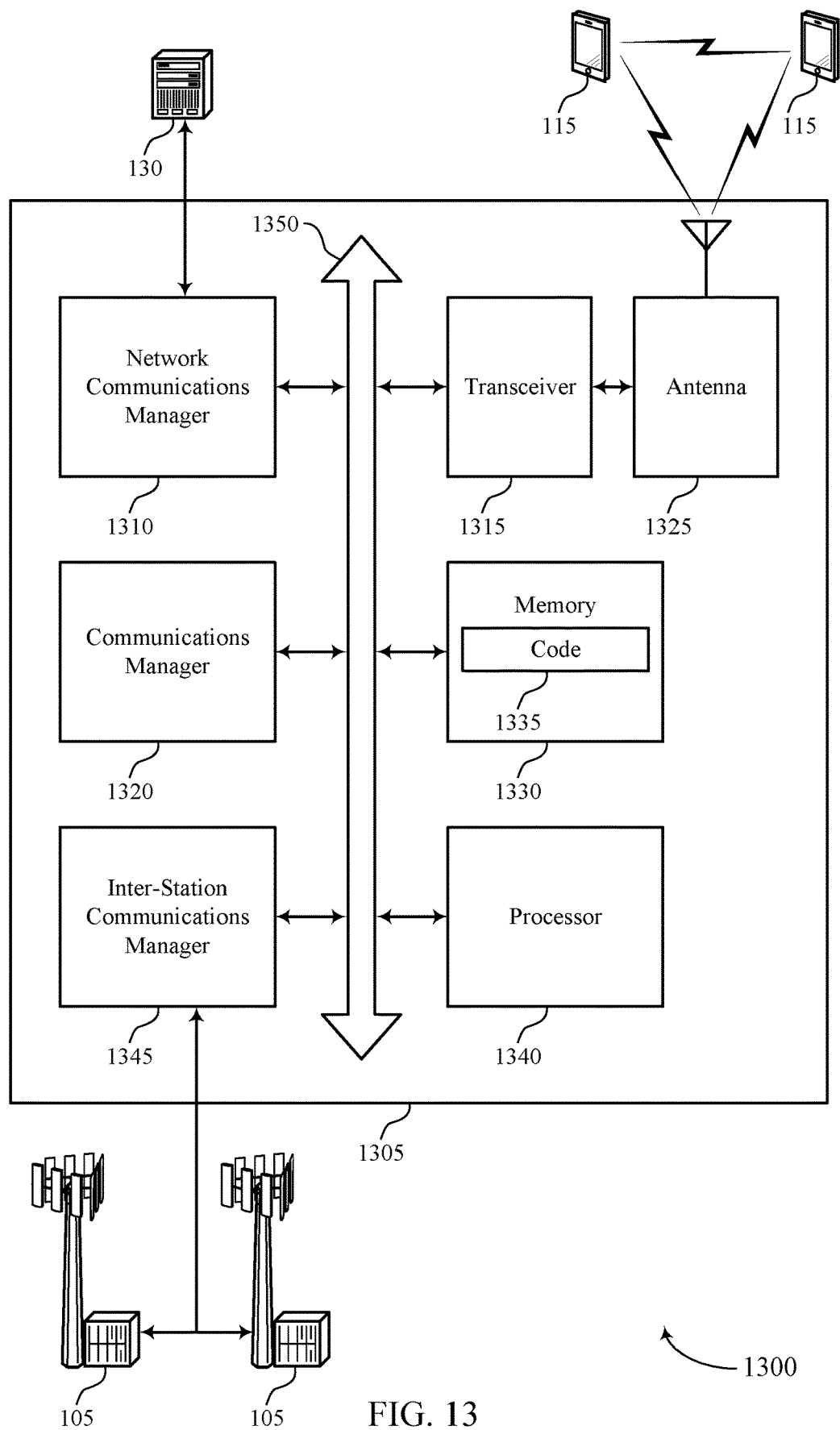
FIG. 13 shows a diagram of a system including a device that supports timing configuration management for network entities in accordance with aspects of the present disclosure.

FIG. 13 shows a diagram of a system 1300 including a device 1305 that supports timing configuration management for network entities in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting timing configuration management for network entities). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communication at a base station in accordance with examples as disclosed herein. For example, the communications manager 1320 may be configured as or otherwise support a means for transmitting, to a UE, an indication of a timing configuration for the UE based on a reference unit, the timing configuration corresponding to a measurement window and a measurement gap for measuring one or more SSBs from a set of satellites, each satellite of the set of satellites associated with the base station. The communications manager 1320 may be configured as or otherwise support a means for transmitting the one or more SSBs based on the measurement gap, the measurement window, and a respective propagation delay between the UE and a satellite of the set of satellites.

By including or configuring the communications manager 1320 in accordance with examples as described herein, the device 1305 may support techniques for a base station to transmit a timing configuration to a UE that may adjust a measurement window, a measurement gap, or both for receiving SSBs from one or more satellites, which may improve communication reliability, reduce latency, improve user experience related to reduced processing, reduce power consumption, cause more efficient utilization of communication resources, improve coordination between devices, increase battery life, improve utilization of processing capability, and the like.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of timing configuration management for network entities as described herein, or the processor 1340 and the memory 1330 may be otherwise configured to perform or support such operations.

Figure 14:
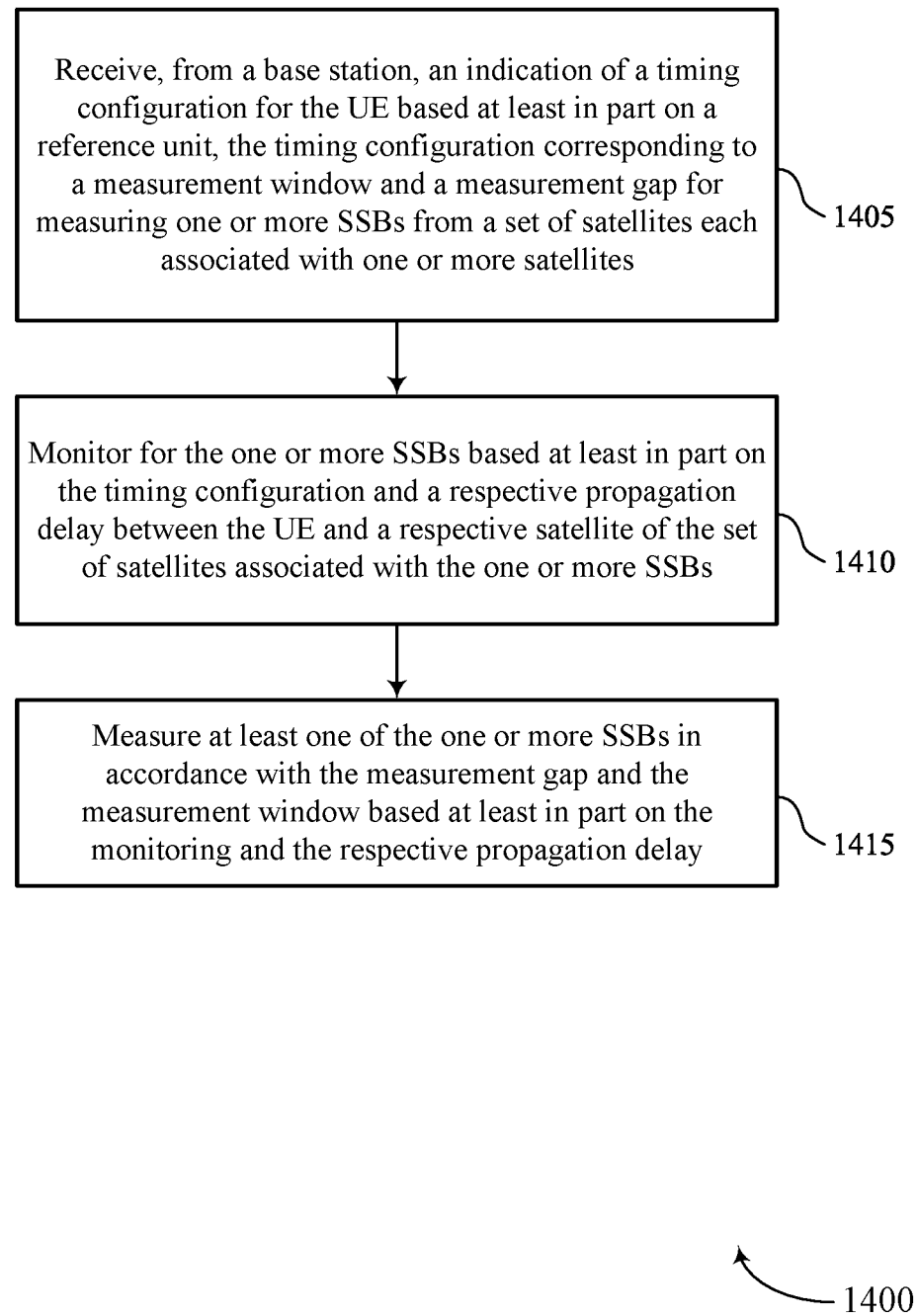
FIGS. 14 through 17 show flowcharts illustrating methods that support timing configuration management for network entities in accordance with aspects of the present disclosure.

FIG. 14 shows a flowchart illustrating a method 1400 that supports timing configuration management for network entities in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, an indication of a timing configuration for the UE based on a reference unit, the timing configuration corresponding to a measurement window and a measurement gap for measuring one or more SSBs from a set of satellites each associated with one or more satellites. The operations of 1405 may be performed in accordance with examples as disclosed herein. In some examples, aspects of the operations of 1405 may be performed by a timing configuration component 825 as described with reference to FIG. 8.

At 1410, the method may include monitoring for the one or more SSBs based on the timing configuration and a respective propagation delay between the UE and a respective satellite of the set of satellites associated with the one or more SSBs. The operations of 1410 may be performed in accordance with examples as disclosed herein. In some examples, aspects of the operations of 1410 may be performed by an SSB component 830 as described with reference to FIG. 8.

At 1415, the method may include measuring at least one of the one or more SSBs in accordance with the measurement gap and the measurement window based on the monitoring and the respective propagation delay. The operations of 1415 may be performed in accordance with examples as disclosed herein. In some examples, aspects of the operations of 1415 may be performed by a measurement timing component 835 as described with reference to FIG. 8.

Figure 15:
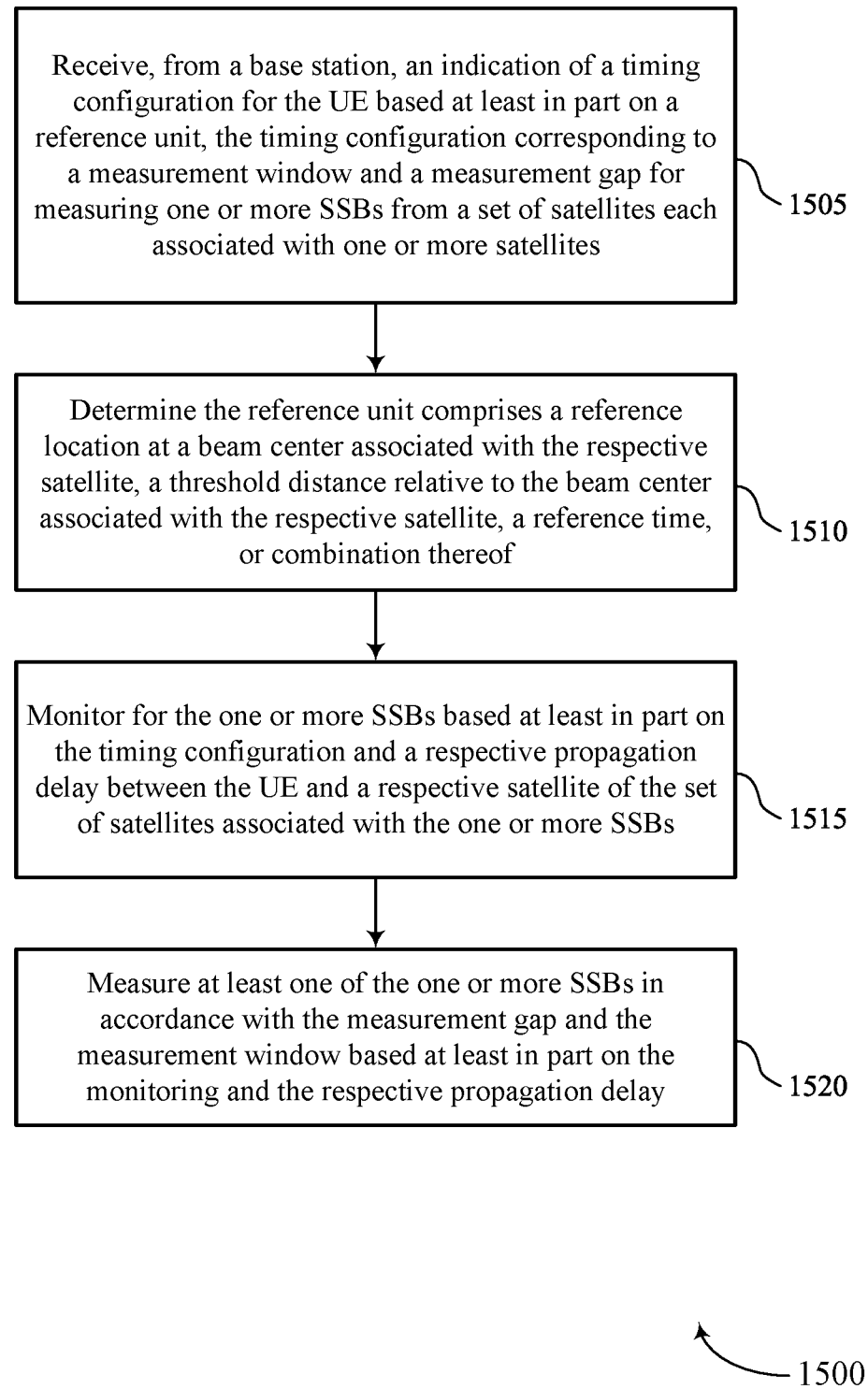

FIG. 15 shows a flowchart illustrating a method 1500 that supports timing configuration management for network entities in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, an indication of a timing configuration for the UE based on a reference unit, the timing configuration corresponding to a measurement window and a measurement gap for measuring one or more SSBs from a set of satellites each associated with one or more satellites. The operations of 1505 may be performed in accordance with examples as disclosed herein. In some examples, aspects of the operations of 1505 may be performed by a timing configuration component 825 as described with reference to FIG. 8.

At 1510, the method may include determining the reference unit includes a reference location at a beam center associated with the respective satellite, a threshold distance relative to the beam center associated with the respective satellite, a reference time, or any combination thereof. The operations of 1510 may be performed in accordance with examples as disclosed herein. In some examples, aspects of the operations of 1510 may be performed by a timing configuration component 825 as described with reference to FIG. 8.

At 1515, the method may include monitoring for the one or more SSBs based on the timing configuration and a respective propagation delay between the UE and a respective satellite of the set of satellites associated with the one or more SSBs. The operations of 1515 may be performed in accordance with examples as disclosed herein. In some examples, aspects of the operations of 1515 may be performed by an SSB component 830 as described with reference to FIG. 8.

At 1520, the method may include measuring at least one of the one or more SSBs in accordance with the measurement gap and the measurement window based on the monitoring and the respective propagation delay. The operations of 1520 may be performed in accordance with examples as disclosed herein. In some examples, aspects of the operations of 1520 may be performed by a measurement timing component 835 as described with reference to FIG. 8.

Figure 16:
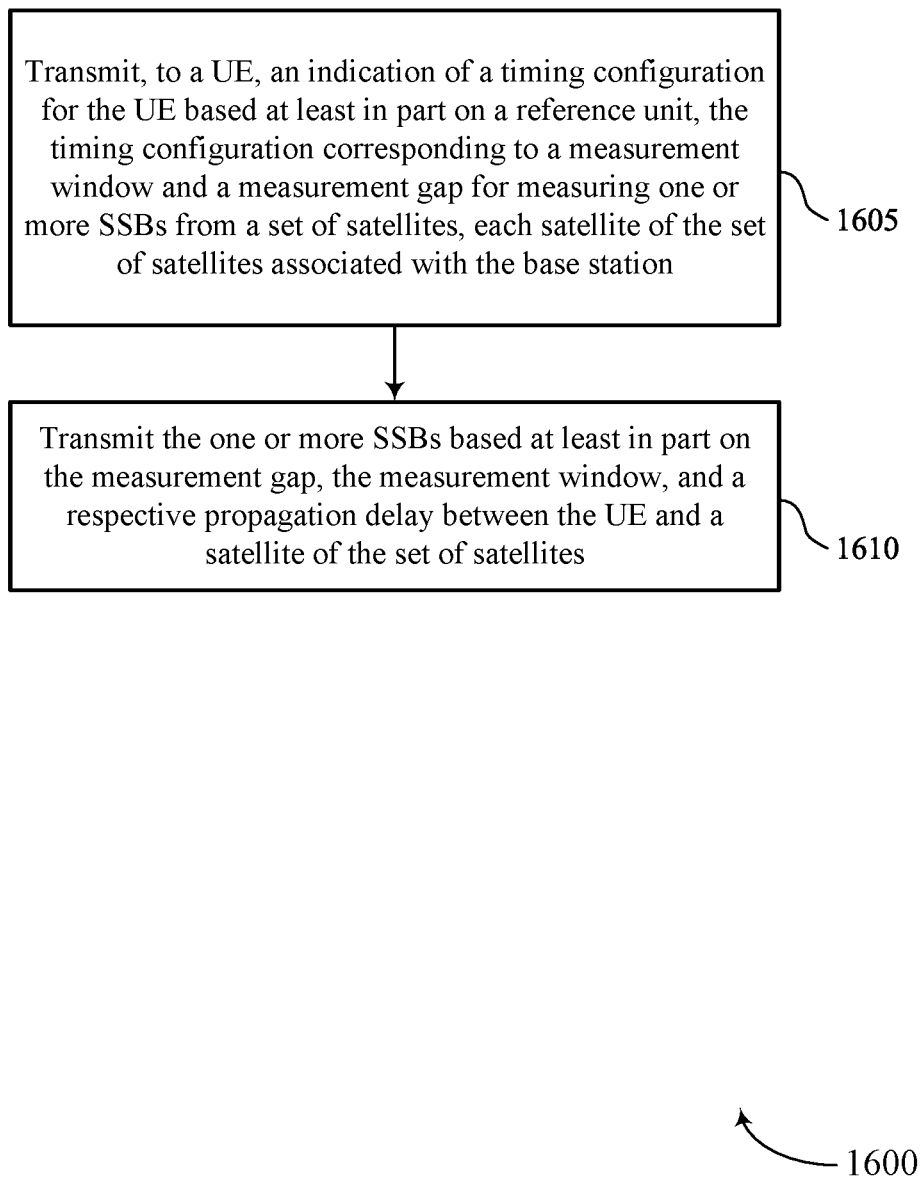

FIG. 16 shows a flowchart illustrating a method 1600 that supports timing configuration management for network entities in accordance with aspects of the present disclosure. The operations of the method 1600 may be implemented by a base station or its components as described herein. For example, the operations of the method 1600 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1605, the method may include transmitting, to a UE, an indication of a timing configuration for the UE based on a reference unit, the timing configuration corresponding to a measurement window and a measurement gap for measuring one or more SSBs from a set of satellites, each satellite of the set of satellites associated with the base station. The operations of 1605 may be performed in accordance with examples as disclosed herein. In some examples, aspects of the operations of 1605 may be performed by a timing configuration manager 1225 as described with reference to FIG. 12.

At 1610, the method may include transmitting the one or more SSBs based on the measurement gap, the measurement window, and a respective propagation delay between the UE and a satellite of the set of satellites. The operations of 1610 may be performed in accordance with examples as disclosed herein. In some examples, aspects of the operations of 1610 may be performed by an SSB manager 1230 as described with reference to FIG. 12.

Figure 17:
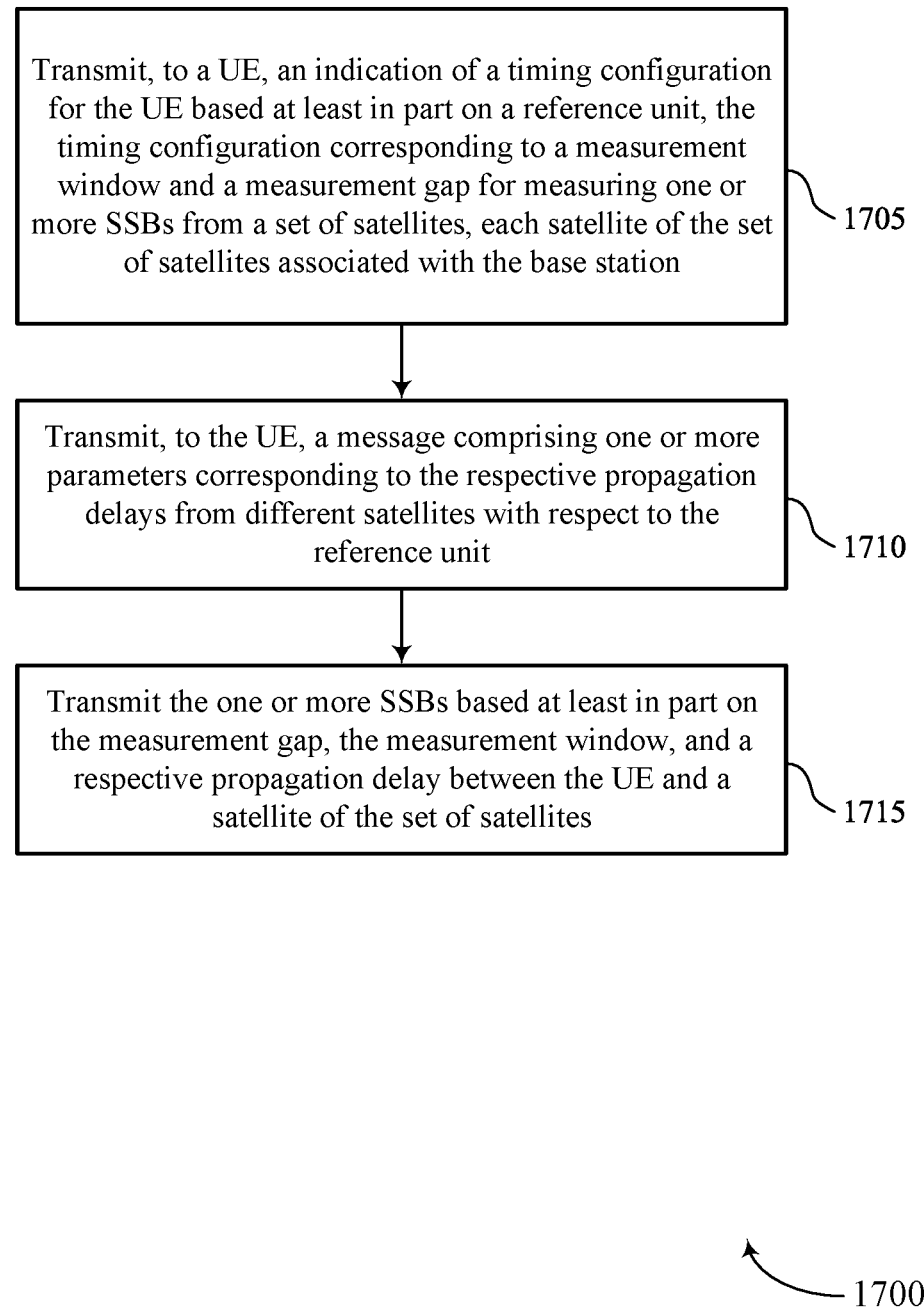

FIG. 17 shows a flowchart illustrating a method 1700 that supports timing configuration management for network entities in accordance with aspects of the present disclosure. The operations of the method 1700 may be implemented by a base station or its components as described herein. For example, the operations of the method 1700 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1705, the method may include transmitting, to a UE, an indication of a timing configuration for the UE based on a reference unit, the timing configuration corresponding to a measurement window and a measurement gap for measuring one or more SSBs from a set of satellites, each satellite of the set of satellites associated with the base station. The operations of 1705 may be performed in accordance with examples as disclosed herein. In some examples, aspects of the operations of 1705 may be performed by a timing configuration manager 1225 as described with reference to FIG. 12.

At 1710, the method may include transmitting, to the UE, a message including one or more parameters corresponding to the respective propagation delays from different satellites with respect to the reference unit. The operations of 1710 may be performed in accordance with examples as disclosed herein. In some examples, aspects of the operations of 1710 may be performed by a timing configuration manager 1225 as described with reference to FIG. 12.

At 1715, the method may include transmitting the one or more SSBs based on the measurement gap, the measurement window, and a respective propagation delay between the UE and a satellite of the set of satellites. The operations of 1715 may be performed in accordance with examples as disclosed herein. In some examples, aspects of the operations of 1715 may be performed by an SSB manager 1230 as described with reference to FIG. 12.

The following provides an overview of aspects of the present disclosure:

Aspect 1: A method for wireless communications at a UE, comprising: receiving, from a base station, an indication of a timing configuration for the UE based at least in part on a reference unit, the timing configuration corresponding to a measurement window and a measurement gap for measuring one or more synchronization signal blocks from a set of satellites each associated with one or more satellites; monitoring for the one or more synchronization signal blocks based at least in part on the timing configuration and a respective propagation delay between the UE and a respective satellite of the set of satellites associated with the one or more synchronization signal blocks; and measuring at least one of the one or more synchronization signal blocks in accordance with the measurement gap and the measurement window based at least in part on the monitoring and the respective propagation delay.

Aspect 2: The method of aspect 1, further comprising: determining the reference unit comprises a reference location at a beam center associated with the respective satellite, a threshold distance relative to the beam center associated with the respective satellite, a reference time, or any combination thereof.

Aspect 3: The method of any of aspects 1 through 2, wherein receiving the indication of the timing configuration comprises: receiving, from the base station, a message comprising one or more parameters corresponding to the respective propagation delays from different satellites with respect to the reference unit.

Aspect 4: The method of aspect 3, wherein the one or more parameters comprise one or more of a periodicity, an offset, a drift rate, a measurement window adjustment rate, or a combination thereof corresponding to a drift of one or more of the set of satellites, a speed of one or more of the set of satellites, or a gateway location of the UE.

Aspect 5: The method of any of aspects 1 through 4, further comprising: receiving a beam switch message indicating the timing configuration; and adjusting the measurement window, the measurement gap, or both based at least in part on the received indication of the timing configuration and the received beam switch message.

Aspect 6: The method of any of aspects 1 through 5, further comprising: receiving an indication of a timer associated with a periodicity for adjustment of the measurement window, the measurement gap, or both; adjusting the measurement window, the measurement gap, or both based at least in part on expiration of the timer, wherein monitoring for the one or more synchronization signal blocks is based at least in part on the adjusted measurement window, the adjusted measurement gap, or both.

Aspect 7: The method of aspect 6, further comprising: receiving an indication of a second timing configuration based at least in part on the expiration of the timer, the second timing configuration indicating the adjusted measurement window, the adjusted measurement gap, or both.

Aspect 8: The method of any of aspects 1 through 7, wherein monitoring for the one or more synchronization signal blocks comprises: monitoring for the one or more synchronization signal blocks in a time slot indicated by the timing configuration and at least one other time slot adjacent to the indicated time slot.

Aspect 9: The method of any of aspects 1 through 8, wherein receiving the indication of the timing configuration comprises: receiving, from the base station, a control message indicating the measurement window and the measurement gap, wherein the indicated measurement window, the indicated measurement gap, or both are based at least in part on one or more defined differential propagation delays corresponding to the set of satellites, and wherein the one or more synchronization signal blocks are monitored during the indicated measurement window, the indicated measurement gap, or both.

Aspect 10: The method of any of aspects 1 through 9, wherein receiving the indication of the timing configuration comprises: receiving, from the base station, a plurality of measurement window configurations corresponding to a single measurement gap, wherein the plurality of measurement window configurations comprises a list of measurement window configurations corresponding to a plurality of satellites including the set of satellites.

Aspect 11: The method of aspect 10, wherein the one or more satellites of the set of satellites share a synchronization signal block frequency, a subcarrier spacing, a measurement object, or any combination thereof for communications with the UE.

Aspect 12: The method of any of aspects 10 through 11, wherein the list of measurement window configurations comprises a synchronization signal block frequency, a subcarrier spacing, a delta signaling of a reference measurement window configuration, or a combination thereof corresponding to the set of satellites.

Aspect 13: The method of any of aspects 10 through 12, wherein the plurality of measurement window configurations of the list of measurement window configurations corresponds to a single base station serving the set of satellites.

Aspect 14: The method of any of aspects 1 through 13, wherein receiving the indication of the timing configuration comprises: receiving, from the base station, an indication of a plurality of measurement gap configurations corresponding to the one or more synchronization signal blocks.

Aspect 15: The method of aspect 14, wherein the indication of the plurality of measurement gap configurations comprises a list of measurement gap configurations, each measurement gap configuration in the list of measurement gap configurations corresponding to a synchronization signal block frequency, a measurement object identifier, or both.

Aspect 16: The method of any of aspects 14 through 15, wherein the indication of the plurality of measurement gap configurations comprises a list of measurement gap parameters comprising a gap offset, a gap time advance, a gap repetition periodicity, a gap duration, or a combination thereof corresponding to a synchronization signal block frequency, a measurement object identifier, or both.

Aspect 17: The method of any of aspects 14 through 16, wherein the indication of the plurality of measurement gap configurations indicates a value of a measurement gap repetition period, a measurement gap timing advance, or both.

Aspect 18: The method of any of aspects 1 through 17, wherein receiving the indication of the timing configuration comprises: receiving an indication of a rate of change of the measurement gap based at least in part on the respective propagation delay; and adjusting the measurement gap according to the rate of change of the measurement gap.

Aspect 19: The method of aspect 18, further comprising: receiving a beam switch message comprising the indication of the rate of change of the measurement gap.

Aspect 20: The method of any of aspects 18 through 19, further comprising: receiving a validity flag for the measurement gap from the base station, the validity flag indicating that the measurement gap is invalid after a validity period; and receiving an indication of a second timing configuration based at least in part on the validity flag indicating that the measurement gap is invalid.

Aspect 21: The method of any of aspects 1 through 20, wherein receiving the indication of the timing configuration comprises: receiving, from the base station, a system information block that indicates the timing configuration or one or more measurement window adjustment parameters.

Aspect 22: The method of any of aspects 1 through 21, wherein the UE, the satellite, the set of satellites, or a combination thereof are nodes in a non-terrestrial network (NTN).

Aspect 23: A method for wireless communication at a base station, comprising: transmitting, to a UE, an indication of a timing configuration for the UE based at least in part on a reference unit, the timing configuration corresponding to a measurement window and a measurement gap for measuring one or more synchronization signal blocks from a set of satellites, each satellite of the set of satellites associated with the base station; and transmitting the one or more synchronization signal blocks based at least in part on the measurement gap, the measurement window, and a respective propagation delay between the UE and a satellite of the set of satellites.

Aspect 24: The method of aspect 23, further comprising: determining the reference unit comprises a reference location at a beam center associated with the satellite, around the beam center associated with the satellite, a reference time, or any combination thereof.

Aspect 25: The method of any of aspects 23 through 24, wherein transmitting the indication of the timing configuration comprises: transmitting, to the UE, a message comprising one or more parameters corresponding to the respective propagation delays from different satellites with respect to the reference unit.

Aspect 26: The method of any of aspects 23 through 25, further comprising: transmitting a beam switch message indicating the timing configuration.

Aspect 27: The method of any of aspects 23 through 26, further comprising: transmitting an indication of a timer associated with a periodicity for adjustment of the measurement window, the measurement gap, or both.

Aspect 28: The method of any of aspects 23 through 27, wherein transmitting the indication of the timing configuration comprises: calculating a rate of change of the measurement gap for each of the one or more synchronization signal blocks; and transmitting an indication of the calculated rate of change of the measurement gap based at least in part on the respective propagation delay.

Aspect 29: An apparatus for wireless communications at a UE, comprising a processor; memory coupled with the processor; and instructions stored in the memory and executable by the processor to cause the apparatus to perform a method of any of aspects 1 through 22.

Aspect 30: An apparatus for wireless communications at a UE, comprising at least one means for performing a method of any of aspects 1 through 22.

Aspect 31: A non-transitory computer-readable medium storing code for wireless communications at a UE, the code comprising instructions executable by a processor to perform a method of any of aspects 1 through 22.

Aspect 32: An apparatus for wireless communication at a base station, comprising a processor; memory coupled with the processor; and instructions stored in the memory and executable by the processor to cause the apparatus to perform a method of any of aspects 23 through 28.

Aspect 33: An apparatus for wireless communication at a base station, comprising at least one means for performing a method of any of aspects 23 through 28.

Aspect 34: A non-transitory computer-readable medium storing code for wireless communication at a base station, the code comprising instructions executable by a processor to perform a method of any of aspects 23 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving a message indicating a timing configuration for the UE based at least in part on a reference unit, the timing configuration corresponding to a measurement window and a measurement gap for measuring one or more synchronization signal blocks from a set of satellites each associated with one or more satellites, the message comprising one or more parameters corresponding to respective propagation delays from different satellites with respect to the reference unit, wherein the one or more parameters comprise one or more of a first periodicity, an offset, a drift rate, a measurement window adjustment rate, or a combination thereof corresponding to a drift of one or more of the set of satellites, a speed of one or more of the set of satellites, or a gateway location of the UE;
   monitoring for the one or more synchronization signal blocks based at least in part on the timing configuration and a respective propagation delay between the UE and a respective satellite of the set of satellites associated with the one or more synchronization signal blocks; and
   measuring at least one of the one or more synchronization signal blocks in accordance with the measurement gap and the measurement window based at least in part on the monitoring and the respective propagation delay.

2. The method of claim 1, further comprising:
   determining the reference unit comprises a reference location at a beam center associated with the respective satellite, a threshold distance relative to the beam center associated with the respective satellite, a reference time, or any combination thereof.

3. The method of claim 1, further comprising:
   receiving a beam switch message indicating the timing configuration; and
   adjusting the measurement window, the measurement gap, or both based at least in part on the received message indicating the timing configuration and the received beam switch message.

4. The method of claim 1, further comprising:
   receiving an indication of a timer associated with a second periodicity for adjustment of the measurement window, the measurement gap, or both; and
   adjusting the measurement window, the measurement gap, or both based at least in part on expiration of the timer, wherein monitoring for the one or more synchronization signal blocks is based at least in part on the adjusted measurement window, the adjusted measurement gap, or both.

5. The method of claim 4, further comprising:
   receiving an indication of a second timing configuration based at least in part on the expiration of the timer, the second timing configuration indicating the adjusted measurement window, the adjusted measurement gap, or both.

6. The method of claim 1, wherein monitoring for the one or more synchronization signal blocks comprises:
   monitoring for the one or more synchronization signal blocks in a time slot indicated by the timing configuration and at least one other time slot adjacent to the indicated time slot.

7. The method of claim 1, wherein receiving the message indicating the timing configuration comprises:
   receiving a plurality of measurement window configurations corresponding to a single measurement gap, wherein the plurality of measurement window configurations comprises a list of measurement window configurations corresponding to a plurality of satellites including the set of satellites.

8. The method of claim 7, wherein the one or more satellites of the set of satellites share a synchronization signal block frequency, a subcarrier spacing, a measurement object, or any combination thereof for communications with the UE.

9. The method of claim 7, wherein the list of measurement window configurations comprises a synchronization signal block frequency, a subcarrier spacing, a delta signaling of a reference measurement window configuration, or a combination thereof corresponding to the set of satellites.

10. The method of claim 7, wherein the plurality of measurement window configurations of the list of measurement window configurations corresponds to a single base station serving the set of satellites.

11. The method of claim 1, wherein receiving the message indicating the timing configuration comprises:
    receiving an indication of a plurality of measurement gap configurations corresponding to the one or more synchronization signal blocks.

12. The method of claim 11, wherein the indication of the plurality of measurement gap configurations comprises a list of measurement gap configurations, each measurement gap configuration in the list of measurement gap configurations corresponding to a synchronization signal block frequency, a measurement object identifier, or both.

13. The method of claim 11, wherein the indication of the plurality of measurement gap configurations comprises a list of measurement gap parameters comprising a gap offset, a gap time advance, a gap repetition periodicity, a gap duration, or a combination thereof corresponding to a synchronization signal block frequency, a measurement object identifier, or both.

14. The method of claim 11, wherein the indication of the plurality of measurement gap configurations indicates a value of a measurement gap repetition period, a measurement gap timing advance, or both.

15. The method of claim 1, wherein receiving the message indicating the timing configuration comprises:
  receiving an indication of a rate of change of the measurement gap based at least in part on the respective propagation delay; and
  adjusting the measurement gap according to the rate of change of the measurement gap.

16. The method of claim 15, further comprising:
  receiving a beam switch message comprising the indication of the rate of change of the measurement gap.

17. The method of claim 15, further comprising:
  receiving a validity flag for the measurement gap from a network device, the validity flag indicating that the measurement gap is invalid after a validity period; and
  receiving an indication of a second timing configuration based at least in part on the validity flag indicating that the measurement gap is invalid.

18. The method of claim 1, wherein receiving the message indicating the timing configuration comprises:
  receiving a system information block that indicates the timing configuration or one or more measurement window adjustment parameters.

19. The method of claim 1, wherein the UE, the set of satellites, or a combination thereof are nodes in a non-terrestrial network (NTN).

20. A method for wireless communication at a network device, comprising:
  transmitting an indication of a timing configuration for a user equipment (UE) based at least in part on a reference unit, the timing configuration corresponding to a measurement window and a measurement gap for measuring one or more synchronization signal blocks from a set of satellites, each satellite of the set of satellites associated with the network device; and
  transmitting the one or more synchronization signal blocks based at least in part on the measurement gap, the measurement window, and a respective propagation delay between the UE and a satellite of the set of satellites.

21. The method of claim 20, further comprising:
  determining the reference unit comprises a reference location at a beam center associated with the satellite, around the beam center associated with the satellite, a reference time, or any combination thereof.

22. The method of claim 20, wherein transmitting the indication of the timing configuration comprises:
  transmitting, to the UE, a message comprising one or more parameters corresponding to respective propagation delays from different satellites with respect to the reference unit.

23. The method of claim 20, further comprising:
  transmitting a beam switch message indicating the timing configuration.

24. The method of claim 20, further comprising:
  transmitting an indication of a timer associated with a periodicity for adjustment of the measurement window, the measurement gap, or both.

25. The method of claim 20, wherein transmitting the indication of the timing configuration comprises:
  calculating a rate of change of the measurement gap for each of the one or more synchronization signal blocks; and
  transmitting an indication of the calculated rate of change of the measurement gap based at least in part on the respective propagation delay.

26. An apparatus for wireless communications at a user equipment (UE), comprising:
  a processor;
  memory coupled with the processor; and
  instructions stored in the memory and executable by the processor to cause the apparatus to:
    receive a message comprising a timing configuration for the UE based at least in part on a reference unit, the timing configuration corresponding to a measurement window and a measurement gap for measuring one or more synchronization signal blocks from a set of satellites each associated with one or more satellites, the message comprising one or more parameters corresponding to respective propagation delays from different satellites with respect to the reference unit, wherein the one or more parameters comprise one or more of a periodicity, an offset, a drift rate, a measurement window adjustment rate, or a combination thereof corresponding to a drift of one or more of the set of satellites, a speed of one or more of the set of satellites, or a gateway location of the UE;
    monitor for the one or more synchronization signal blocks based at least in part on the timing configuration and a respective propagation delay between the UE and a respective satellite of the set of satellites associated with the one or more synchronization signal blocks; and
    measure at least one of the one or more synchronization signal blocks in accordance with the measurement gap and the measurement window based at least in part on the monitoring and the respective propagation delay.

27. An apparatus for wireless communication at a network device, comprising:
  a processor;
  memory coupled with the processor; and
  instructions stored in the memory and executable by the processor to cause the apparatus to:
    transmit an indication of a timing configuration for a user equipment (UE) based at least in part on a reference unit, the timing configuration corresponding to a measurement window and a measurement gap for measuring one or more synchronization signal blocks from a set of satellites, each satellite of the set of satellites associated with the network device; and
    transmit the one or more synchronization signal blocks based at least in part on the measurement gap, the measurement window, and a respective propagation delay between the UE and a satellite of the set of satellites.

28. An apparatus for wireless communications at a user equipment (UE), comprising:
  a processor;
  memory coupled with the processor; and
  instructions stored in the memory and executable by the processor to cause the apparatus to:
    receive a message comprising a timing configuration for the UE based at least in part on a reference time, the timing configuration corresponding to a measurement window and a measurement gap for measuring one or more synchronization signal blocks from a set of satellites each associated with one or more satellites, the message comprising one or more parameters corresponding to respective propagation delays from different satellites with respect to the reference time, wherein the one or more parameters comprise one or more of a periodicity, an offset, a drift rate, a measurement window adjustment rate, or a combination thereof corresponding to a drift of one or more of the set of satellites, a speed of one or more of the set of satellites, or a gateway location of the UE;

monitor for the one or more synchronization signal blocks based at least in part on the timing configuration and a respective propagation delay between the UE and a respective satellite of the set of satellites associated with the one or more synchronization signal blocks; and measure at least one of the one or more synchronization signal blocks in accordance with the measurement gap and the measurement window based at least in part on the monitoring and the respective propagation delay.

29. An apparatus for wireless communication at a network device, comprising:

a processor;

memory coupled with the processor; and instructions stored in the memory and executable by the processor to cause the apparatus to:

transmit an indication of a timing configuration for a user equipment (UE) based at least in part on a reference time, the timing configuration corresponding to a measurement window and a measurement gap for measuring one or more synchronization signal blocks from a set of satellites, each satellite of the set of satellites associated with the network device; and transmit the one or more synchronization signal blocks based at least in part on the measurement gap, the measurement window, and a respective propagation delay between the UE and a satellite of the set of satellites.

* * * * *